(12) United States Patent
Androulaki et al.

(10) Patent No.: US 11,777,712 B2
(45) Date of Patent: Oct. 3, 2023

(54) INFORMATION MANAGEMENT IN A DATABASE

(71) Applicant: International Business Machines Corporation, Armonk, NY (US)

(72) Inventors: Elli Androulaki, Zürich (CH); Angelo De Caro, Zürich (CH); Alessandro Sorniotti, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 16/361,648

(22) Filed: Mar. 22, 2019

(65) Prior Publication Data

US 2020/0304289 A1 Sep. 24, 2020

(51) Int. Cl.
*H04L 9/06* (2006.01)
*G06F 21/62* (2013.01)
*G06F 21/60* (2013.01)
*H04L 9/00* (2022.01)

(52) U.S. Cl.
CPC .......... *H04L 9/0637* (2013.01); *G06F 21/602* (2013.01); *G06F 21/6245* (2013.01); *H04L 9/0643* (2013.01); *H04L 9/50* (2022.05)

(58) Field of Classification Search
CPC . H04L 9/0637; H04L 9/0643; H04L 2209/38; H04L 9/50; H04L 9/3239; H04L 63/101; H04L 9/3242; G06F 21/602; G06F 21/6245; G06F 21/64; G06F 21/33; G06F 21/6227
USPC ........................................................ 713/155
See application file for complete search history.

(56) References Cited

U.S. PATENT DOCUMENTS

| | | | | |
|---|---|---|---|---|
| 6,199,121 B1* | 3/2001 | Olson | ..................... | G06F 13/28 710/24 |
| 7,849,318 B2* | 12/2010 | Zhang | ................... | H04L 9/3236 713/176 |
| 8,272,060 B2* | 9/2012 | Milliken | ............... | G06F 21/562 713/180 |
| 8,930,274 B1* | 1/2015 | Brickell | ................. | G06Q 20/40 705/44 |
| 9,274,800 B2* | 3/2016 | Junghans | ................ | G06F 7/544 |
| 9,397,985 B1 | 7/2016 | Seger et al. | | |

(Continued)

FOREIGN PATENT DOCUMENTS

GB         2587201 A   *   9/2019   ......... G06F 16/1805
JP     2010114480 A   *   5/2010

(Continued)

OTHER PUBLICATIONS

Ali, Muhammad Salek, et al., "IoT Data Privacy via Blockchains and IPFS," 7th International Conference for the Internet of Things, 2017, 7 pages.

(Continued)

*Primary Examiner* — Shahriar Zarrineh

(57) ABSTRACT

An example operation may include one or more of receiving an event from a node, extracting an identifier from the event, determining whether the event is authorized, and generating a notification of the event when the identifier is authorized, wherein the identifier includes a hashed value of an event counter and wherein the identifier is authorized when the hashed value matches a hashed value of the event counter stored in a storage area of or coupled to the client.

20 Claims, 21 Drawing Sheets

(56) References Cited

U.S. PATENT DOCUMENTS

| | | | |
|---|---|---|---|
| 9,705,678 B1* | 7/2017 | Wang | H04L 63/1466 |
| 10,104,077 B1* | 10/2018 | Irwan | H04L 63/0442 |
| 10,230,756 B2* | 3/2019 | Androulaki | H04L 63/04 |
| 10,256,981 B2* | 4/2019 | Kisley | G06F 16/1805 |
| 10,419,408 B1* | 9/2019 | Herzberg | H04L 12/40189 |
| 10,469,262 B1* | 11/2019 | Schroeder | H04L 63/166 |
| 10,476,847 B1* | 11/2019 | Smith | H04L 63/0407 |
| 10,785,021 B1* | 9/2020 | Prabhat | H04L 9/0863 |
| 10,826,685 B1* | 11/2020 | Campagna | H04L 9/0637 |
| 2004/0193763 A1* | 9/2004 | Iizuka et al. | G06F 13/24 710/52 |
| 2004/0215921 A1* | 10/2004 | Alexander | G06F 9/3802 711/216 |
| 2004/0267668 A1* | 12/2004 | Aissi | G06F 21/60 705/50 |
| 2005/0135608 A1* | 6/2005 | Zheng | H04L 9/0662 380/28 |
| 2005/0204140 A1* | 9/2005 | Maruyama | H04L 9/3263 713/175 |
| 2006/0288224 A1* | 12/2006 | Won | H04L 9/3247 713/181 |
| 2008/0010218 A1* | 1/2008 | Zank | G06Q 30/06 705/75 |
| 2008/0177799 A1* | 7/2008 | Wilson | G06F 21/64 |
| 2009/0198619 A1* | 8/2009 | Tripunitara | G06Q 20/3829 705/71 |
| 2009/0228433 A1* | 9/2009 | Aguilar Saborit | G06F 16/24556 |
| 2009/0287904 A1* | 11/2009 | Bybell | G06F 21/57 711/216 |
| 2010/0049986 A1* | 2/2010 | Watanabe | H04L 9/0643 713/181 |
| 2010/0166322 A1* | 7/2010 | Madruga | G01V 5/0008 382/218 |
| 2010/0312986 A1* | 12/2010 | Fujiwara | H04L 1/0061 711/216 |
| 2010/0318786 A1* | 12/2010 | Douceur | H04L 9/3247 713/155 |
| 2011/0083015 A1* | 4/2011 | Meier | H04L 9/3236 713/176 |
| 2011/0208965 A1* | 8/2011 | Machani | H04L 9/0891 713/168 |
| 2011/0238989 A1* | 9/2011 | Machani | H04L 9/3242 713/168 |
| 2011/0320793 A1* | 12/2011 | Bell, Jr. | G06F 9/3848 712/240 |
| 2012/0066349 A1* | 3/2012 | Trotter | H04L 63/0853 709/219 |
| 2012/0087490 A1* | 4/2012 | Ollikainen | H04L 9/0637 380/28 |
| 2012/0207305 A1* | 8/2012 | Gallo | H04W 4/80 380/271 |
| 2013/0054942 A1* | 2/2013 | Serrano | G06F 21/54 712/241 |
| 2013/0055346 A1* | 2/2013 | Singh | G06F 21/34 726/3 |
| 2014/0126393 A1* | 5/2014 | Kirshnan | H04L 43/026 370/252 |
| 2014/0133651 A1* | 5/2014 | Furukawa | G06F 21/602 380/44 |
| 2014/0351579 A1* | 11/2014 | Leggette | G06F 11/141 713/156 |
| 2016/0026783 A1* | 1/2016 | Buer | G06F 3/0622 711/103 |
| 2016/0292672 A1* | 10/2016 | Fay | G06Q 20/3829 |
| 2016/0328713 A1* | 11/2016 | Ebrahimi | G06K 19/06028 |
| 2016/0364716 A1* | 12/2016 | Bakshi | G06Q 20/3224 |
| 2016/0366109 A1* | 12/2016 | Lablans | G06Q 20/34 |
| 2017/0090814 A1* | 3/2017 | Yeung | G06F 3/0673 |
| 2017/0148016 A1* | 5/2017 | Davis | G06Q 20/389 |
| 2017/0149819 A1* | 5/2017 | Androulaki | H04L 9/3236 |
| 2017/0230375 A1 | 8/2017 | Kurian | |
| 2017/0243193 A1 | 8/2017 | Manian et al. | |
| 2017/0344987 A1* | 11/2017 | Davis | G06F 16/2255 |
| 2017/0364689 A1* | 12/2017 | Pappachan | G06F 13/20 |
| 2018/0048462 A1* | 2/2018 | Salmela | H04W 12/37 |
| 2018/0097779 A1* | 4/2018 | Karame | G06Q 20/382 |
| 2018/0114220 A1* | 4/2018 | Ekberg | H04L 9/007 |
| 2018/0234843 A1* | 8/2018 | Smyth | H04L 9/3242 |
| 2018/0276666 A1* | 9/2018 | Haldenby | G06Q 20/20 |
| 2018/0285879 A1* | 10/2018 | Gadnis | H04L 9/0825 |
| 2018/0331832 A1* | 11/2018 | Pulsifer | H04L 9/0637 |
| 2019/0042620 A1* | 2/2019 | Garagiola | G06F 16/2453 |
| 2019/0043600 A1* | 2/2019 | Saileshwar | G06F 12/1408 |
| 2019/0081796 A1* | 3/2019 | Chow | H04L 9/30 |
| 2019/0121742 A1* | 4/2019 | Bhimani | G06F 12/0638 |
| 2019/0163913 A1* | 5/2019 | Sun | G06F 12/1408 |
| 2019/0182049 A1* | 6/2019 | Juels | H04L 9/3247 |
| 2019/0188707 A1* | 6/2019 | Arora | G06Q 20/3224 |
| 2019/0245688 A1* | 8/2019 | Patin | H04L 9/0637 |
| 2019/0253396 A1* | 8/2019 | Chandrakasan | H04L 9/3066 |
| 2019/0268162 A1* | 8/2019 | Sahagun | H04L 9/3236 |
| 2019/0295079 A1* | 9/2019 | Bae | H04L 63/1425 |
| 2019/0377724 A1* | 12/2019 | Pennington | G06Q 20/389 |
| 2020/0014527 A1* | 1/2020 | Subramaniam | G06F 21/64 |
| 2020/0019725 A1* | 1/2020 | Rule | G06K 19/0723 |
| 2020/0042635 A1* | 2/2020 | Douglass | H04L 9/3239 |
| 2020/0042960 A1* | 2/2020 | Cook | G06F 16/27 |
| 2020/0044856 A1* | 2/2020 | Lynde | H04L 9/0618 |
| 2020/0050386 A1* | 2/2020 | Natarajan | G06F 3/067 |
| 2020/0052886 A1* | 2/2020 | Buldas | H04L 9/0869 |
| 2020/0084222 A1* | 3/2020 | William | H04L 9/0869 |
| 2020/0092106 A1* | 3/2020 | Leong | H04L 9/3268 |
| 2020/0134656 A1* | 4/2020 | Padmanabhan | H04L 9/0637 |
| 2020/0136808 A1* | 4/2020 | Chasko | H04L 9/3239 |
| 2020/0213128 A1* | 7/2020 | Sharma | H04L 9/0643 |
| 2020/0241929 A1* | 7/2020 | Arrasjid | G06F 11/3409 |
| 2020/0278963 A1* | 9/2020 | Destefanis | H04L 9/3239 |
| 2020/0351074 A1* | 11/2020 | Wood | H04L 63/067 |
| 2020/0382277 A1* | 12/2020 | Kong | G06F 21/64 |
| 2020/0389294 A1* | 12/2020 | Soundararajan | G06Q 20/36 |
| 2020/0403803 A1* | 12/2020 | Werner | H04L 9/14 |
| 2021/0081398 A1* | 3/2021 | Krishnan | G06F 16/2365 |
| 2021/0135840 A1* | 5/2021 | Naito | H04L 9/3242 |

FOREIGN PATENT DOCUMENTS

| | | | | |
|---|---|---|---|---|
| JP | 2019029921 A | * | 2/2019 | |
| KR | 101366442 B1 | * | 2/2014 | |
| WO | WO-9625814 A1 | * | 8/1996 | G06Q 20/341 |
| WO | WO-2014015827 A1 | * | 1/2014 | G06Q 20/341 |
| WO | WO-2015044162 A1 | * | 4/2015 | G06Q 20/322 |
| WO | WO-2016068942 A1 | * | 5/2016 | G06F 21/602 |

OTHER PUBLICATIONS

Hashemi, Sayed Hadi, et al., "Decentralized User-Centric Access Control using PubSub over Blockchain," arXiv preprint arXiv:1710.00110, 2017, 15 pages.

Kravitz, David W., et al., "Securing User Identity and Transactions Symbiotically: IoT meets Blockchain," Global Internet of Things Summit (GIoTS), 2017, pp. 1-6, IEEE, 2017.

* cited by examiner

350

| Chaincode ID | Event Secret | Next-Event-ID | Counter Value |
|---|---|---|---|
| First Chaincode | Event_Secret_1 | HMAC(Event_Secret_1, X_1 + 1) | $X_1$ |
| Second Chaincode | Event_Secret_2 | HMAC(Event_Secret_2, X_2 + 1) | $X_2$ |
| Third Chaincode | Event_Secret_3 | HMAC(Event_Secret_3, X_3 + 1) | $X_3$ |

FIG. 3C

INFORMATION MANAGEMENT IN A DATABASE

TECHNICAL FIELD

This application generally relates to a database storage system, and more particularly, to information management in a database.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by its inability to adequately protect the privacy interests of its users and the data stored therein. As such, what is needed is a solution to overcome these and other significant drawbacks.

SUMMARY

One example embodiment provides a system that includes a receiver to receive an event, a storage area to store information, and a processor to extract an identifier from the event and determine whether the event is authorized based on the identifier, wherein the identifier includes a first hashed value of an event counter that counts a number of events transmitted in a storage system and wherein the information includes a second hashed value, the processor to authorize the event for notification to a user in the storage system when the first hashed value corresponds to the second hashed value.

Another example embodiment provides a method that includes one or more of receiving an event from a node, extracting an identifier from the event, determining whether the event is authorized, and generating a notification of the event when the identifier is authorized, wherein the identifier includes a hashed value of an event counter and wherein the identifier is authorized when the hashed value matches a hashed value of the event counter stored in a storage area of or coupled to the client.

A further example embodiment provides a non-transitory computer readable medium comprising instructions, that when read by a processor, cause the processor to perform one or more of receive an event from a node, extract an identifier from the event, determine whether the event is authorized, and generate a notification of the event when the identifier is authorized, wherein the identifier includes a hashed value of an event counter and wherein the identifier is authorized when the hashed value matches a hashed value of the event counter stored in a storage area of or coupled to the client.

BRIEF DESCRIPTION OF THE DRAWINGS

FIG. 3C illustrates an example of an event information table.

DETAILED DESCRIPTION

Figure 1:
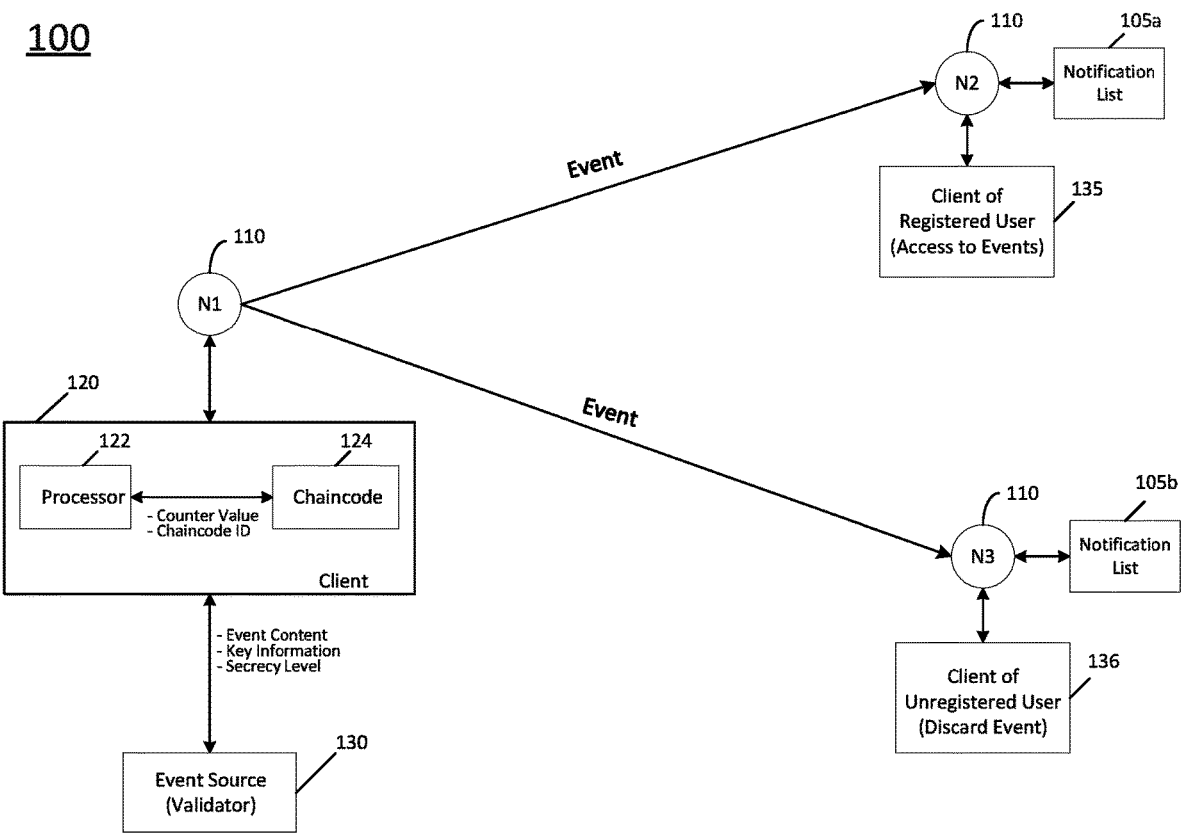
FIG. 1 illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

An event is one type of message transmitted in blockchain networks and other types of decentralized databases. An event may be created by a validator using chaincode of a smart contract when specific conditions are met. One type of event, referred to as a base event, may be created, for example, when a new block of transactions is to be committed to a blockchain. Another type of event, referred to as a custom event, may constitute a part or indicate a state of chaincode. For example, a custom event may relate to certain messages the chaincode has designated for distribution to entities (e.g., nodes, users, clients, etc.) inside or outside the network.

It is not uncommon for the events of a network to have varying levels of privacy, access, or restriction as determined, for example, by their validators and/or network policy. For example, some events may have secret status, in that they are only to be read by authorized users of network nodes. Other events may have a less restrictive status, in that they may be read by all or an expanded number of users. Different chaincode may be used to manage the creation, distribution, and/or access of events that have different status levels.

In accordance with one or more embodiments, event management may be performed in a manner that protects the privacy interests of validators (and users who have a predetermined (e.g., elevated secrecy) status), and that also increases the efficiency of the network. In one implementation, network users who have been authorized to receive events from a validator may register on a notification list maintained by one or more peer nodes. The notification list may identify, for example, users who are eligible to receive one or more of the following: all events and messages sent by a validator, only base events sent by the validator, or only custom events sent by the validator. Users authorized to receive custom events may have secret status. In one embodiment, secret status may mean that the client of the user may include key information for decrypting the events, which key information may not be in the possession of nodes or clients that are not to receive events from the validator. The validator may be a peer node, client, user, owner of a node, or an application.

Example embodiments, thus, provide methods, systems, components, non-transitory computer readable media, devices, and/or networks, which that perform event management in a database in a way that increases the privacy interests of its users and also improves efficiency by reducing processing overhead at the node and client levels.

In one or more embodiments, event management may be performed to allow users to efficiently detect events they are authorized to receive from a validator and, in some cases, not even be notified of receipt of an event when not authorized by the validator. This will alleviate the need for users to perform a computationally rigorous number of decryption attempts (for example, using keys of all chaincode smart contracts assigned to them) in order to determine whether a received event is authorized to be received and whether access to the content of that message is possible. This also alleviates the need of having users decrypt all events they receive, one-by-one, in order to determine if those events are intended to be received by them.

The system, method, media, device, and/or network embodiments may be especially beneficial when, for example, the ability of chaincode to encrypt events using a long-term encryption key of a user is not able to be performed. This may occur, for example, when the chaincode does not know the identities of the authorized users for those events.

Additionally, one or more embodiments represent an improvement in the operation of a database by allowing clients to control access to secret events. This may be accomplished by blocking unauthorized users from accessing events in a manner transparent to those users. These results may be achieved when, for example, authorization cannot be determined using encryption.

In accordance with these or other embodiments, a system, method, media, device, and/or network is provided that allows events of confidential chaincode to be readable by users who are only authorized to decrypt the state of that chaincode. This may be accomplished by incorporating an identifier into an event with encryption. The identifier may include a hashed-based message authentication code (HMAC) generated based on predetermined information. A filter may be used at a receiver node to prevent unintended users from accessing content of the event. These embodiments may be especially useful in various type of decentralized databases.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information. In one embodiment, a transaction may include an event as described herein to be received by only a subset of nodes and/or clients/users in accordance with one or more embodiments. In one or more embodiments, the transactions (including the events) may be included in a block appended to the blockchain.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include performing event management in a database in a manner that allows users to detect events they are authorized to access without having to perform a computationally rigorous number of decryption attempts (for example, using keys of all chaincode smart contracts assigned to them). Another benefit is to block notification to a user that an event has even been received, when the user is not authorized to receive the event. This will streamline efficiency of processing events in the system at the node and client level, and may be performed without placing undue burden on users who are not authorized to receive events. Moreover, blocking notification of events allows for an enhanced level of secrecy in the network, at least with respect to the interests of the originator of the message. These benefits may be accomplished by incorporating an identifier (as previously described) in the event that allows the event to only be accessed by authorized users. Such features are especially suitable for use in network employing a blockchain.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, event management is implemented due to use of the identifier, which, in one non-limiting implementation, may contain information suitable for or inherent and unique to blockchain. In one or more embodiments, such an identifier may include a hashed value of an event counter value and/or one or more labels indicative of originating chaincode and/or the status of the event. If the user is authorized to receive the event, then the same hashed value will be maintained by a client of the user, and the matching of these values may be used as a basis for providing notification and access to the event relative to authorized users.

One of the benefits of the example embodiments is that it improves the functionality of a computing system by improving the efficiency of event management, and more particularly event notification and access, only by authorized users. Especially when applied to blockchain, a computing system may be provided that can protect the privacy interests of users and their associated validators.

The example embodiments provide numerous benefits over a traditional database. For example, through the blockchain the embodiments provide a way of substantially reducing computations and processing that otherwise would be required in a traditional database. Also, a traditional database is unable to provide the level of secrecy that one or more embodiments described herein are able to provide. Meanwhile, a traditional database could not be used to implement the example embodiments because they do not have the peer-to-peer connection structure of blockchain, nor do they use certificates and keys and other encryption/decryption techniques of blockchain to perform event management as described herein.

The example embodiments also change how data may be stored within a block structure of the blockchain. For example, blocks may appended to the blockchain that provide a record of secret events transmitted to authorized users. The events may include hashed identifiers in predetermined fields that allow for notification and access of events only by authorized users. By storing event information within data blocks of a blockchain, an event record may be maintained in the immutable ledger through a hash-linked chain of blocks. In some embodiments, the data block may be different than a traditional data block by their inclusion of labels or identifiers, as mentioned above, as well as an indication of the secrecy level of the events. Traditional block structures of a blockchain do not have this information.

FIG. 1 illustrates a logic diagram of a system 100 which includes a peer-to-peer connection of nodes 110 in a blockchain network, according to example embodiments. The nodes 110 include a first node N1, a second node N2, and a third node N3. In another embodiment, a different number of nodes may be included.

Referring to FIG. 1, the first node N1 is coupled to a client 120 which includes a processor 122 and a storage area 124 that stores chaincode of a smart contract for the processor. The processor 122 and storage area 124 may be coupled to an event source 130, which, for example, may be a validator. The validator may be the owner of node N1 or another entity that supplies content of an event to be broadcast in the network. The event source 130 may use one or more keys to encrypt the event and/or a transaction or block for the event. Corresponding key information may be located at one or more other nodes (e.g., node N2) or an associated client that may be used to perform decryption to access events. Other nodes (e.g., node N3) or their associated clients that do not have this key information cannot perform decryption and thus cannot access the events, at least with respect to validator 130.

The chaincode in the storage area 124 may provide information which, when coupled with information from the event source/validator 130, may be used to generate an event. The information from event source 130 may include, for example, content of the event, key information, and the status level of the event. The chaincode may provide an identifier, a chaincode descriptor, and other information. In one embodiment, the chaincode may be executed by the processor 122 to compute the identifier using a hashing algorithm or code, in a manner to be discussed in greater detail below. The identifier may be used as a basis for determining whether users have access to the event.

The second node N2 is an example of a node associated with a client or user intended to receive events from the event source 130. The third node N3 is an example of a node associated with a client or user who is not intended to receive events from the event source (validator) 130, although it may be registered to receive events from other event sources (validators) in the network.

Operating in accordance with the chaincode in storage area 124, the processor 122 of client 120 may transmit the event so that it is received by all nodes (e.g., at least all the peer nodes) in the network, but only a subset of nodes, clients, or users in the network actually will be able to access the content of the event. This may be accomplished, for example, using a publish/subscribe messaging protocol, where one of the nodes N1 publishes events that are to be received by nodes N2 and N3, but only a client or user of node N2 who is a subscriber can access the event content.

In one embodiment of the publish/subscribe messaging protocol, the processor 122 of node N2 operates as a messaging manager that publishes events when a certain condition is satisfied. For example, processor 122 may publish an event when the validator wants to send a message to subscribers in the network. Additionally, or alternatively, processor 122 may publish an event when one or more nodes commit a new block to the blockchain. In this case, the event may notify corresponding subscribers that a new block has been committed and, optionally, may include additional information describing what type of information or action was taken in connection with the new block. In one embodiment, the event may include information not directly related to the blockchain, or which conveys information to the subscribers but is otherwise unrelated to a blockchain transaction. The events may be public or private.

In the example of FIG. 1, node N1 serves as a publishing node which transmits an event. The publishing node N1 may publish the event on the network without specifically addressing the subscribers. This streamlines the efficiency and performance of the event notification. When published, the clients or users receive notification of the event based on a notification list maintained by corresponding nodes in the blockchain network. The notification list at each node may be stored, for example, in a state database of the node (e.g., LevelDB, CouchDB, or another part of the state database) or at another storage area coupled to or within the node. In one embodiment, the notification list may identify whether any of the users or clients of those nodes are subscribers of the validator generating the event. If so, the receiving node automatically pushes the event to the subscriber client or user. In the example of FIG. 1, a subscriber (e.g., client or user) of node N2 is identified in the notification list maintained by node N2, but none of the clients or users of node N3 are identified in the notification list of node N3.

The subscribers may subscribe with their own peer nodes to receive the events. The subscriptions may be voluntarily when, for example, events are classified as public, or with permission from the validators and/or in accordance with a network policy when the events are classified as private.

Thus, the validators (or node software) do not program events to be sent directly to specific receivers (or subscribers). Instead, in one embodiment, the events may be categorized into classes of users or topics or otherwise and sent to the messaging manager. An example of an implementation involving the notification lists will now be described.

In one implementation, the events correspond to transactions sent to nodes in the network. For example, node N1 may transmit an event as transaction data to an ordering service node. (The transaction may or may not be endorsed by one or more other nodes before it is sent to the ordering service node.) The ordering service node may generate a transaction based on the transaction data, and then include the transaction with other transactions in a certain order within a block that is proposed to be added to the blockchain. The block is then transmitted to the peer nodes for validation.

In one embodiment, logic at each of the peer nodes may compare information or data in transactions of the block to a notification list to determine whether there is a match, e.g., to determine whether any of the transactions are to be received by a subscriber (e.g., client or user) on the list. This may be determined, for example, in any of the ways described herein, including but not limited to a notification list that identifies users who are eligible to receive one or more of the following: all events and messages sent by a validator, only base events sent by the validator, or only custom events sent by the validator. Additionally, or alternatively, the comparison may be performed to identify a subscriber having secret status, e.g., a client in possession of a key information for decrypting the event. Additionally, or alternatively, the logic at the peer nodes may compare information of the transaction (e.g., based a class of the event, subject matter of the event, a group of the event, event source or validator information corresponding to a subscriber indicated by the event, or other information as indicated herein) to information in the notification list. When the logic determines that the block includes a transaction intended for a subscriber on the list, the logic may send the transaction to a client corresponding to the subscriber, where it is decrypted, verified, filtered, and output to a user/subscriber.

During the process, the block may be validated by the node, confirmed by a consensus protocol, and then subsequently committed to the blockchain in the copy of the shared ledger managed by the node and the ledgers of the other nodes. A state database associated with each node may be updated to reflect the event. A more specific description of this processes may be provided relative to other figures herein, including FIG. 3B.

Correlating these features to FIG. 1, each node N2 and N3 may maintain a notification list of clients or users associated with that node who are registered (subscribed or otherwise authorized) to receive events from the event source 130. A client 135 of a registered user is coupled to node N2 and may include one or more keys for allowing transactions (events) to be decrypted. Prior to receipt of the event, the user of client 135 may, for example, register (or subscribe) with its own peer node N2 to receive events from event source 130. Thus, the client 135 of node N2 may notify the registered user of the event and allow the user to access to the event when received. In one embodiment, the client 135 may allow the user access to the content of the message once a verification is performed to confirm that the user in on the notification list 105a of second node N2.

A client 136 of an unregistered user is coupled to node N3. Because this user is not on the notification list 105b of its own peer node N3 or is otherwise not authorized to receive events from event source 130, the client 136 of the third node N3 may discard the event (e.g., not forward the event to the client 136) without notifying the unauthorized user that the event was received. This may be accomplished, for example, using a filter as described below.

In one embodiment, after a block including an event is validated and committed to the ledger of each peer node, the logic of each peer node may perform the process of comparing the transaction (event) to the notification list. If there is a match, the event may be decrypted and filtered at a corresponding client and its content output to a user. Because clients on nodes that do not correspond to subscribers are not on the notification list and otherwise do not have a decryption key, non-subscriber clients are not able to access the event, even though their respective nodes may receive the event when published or otherwise broadcast in the blockchain network.

Figure 2:
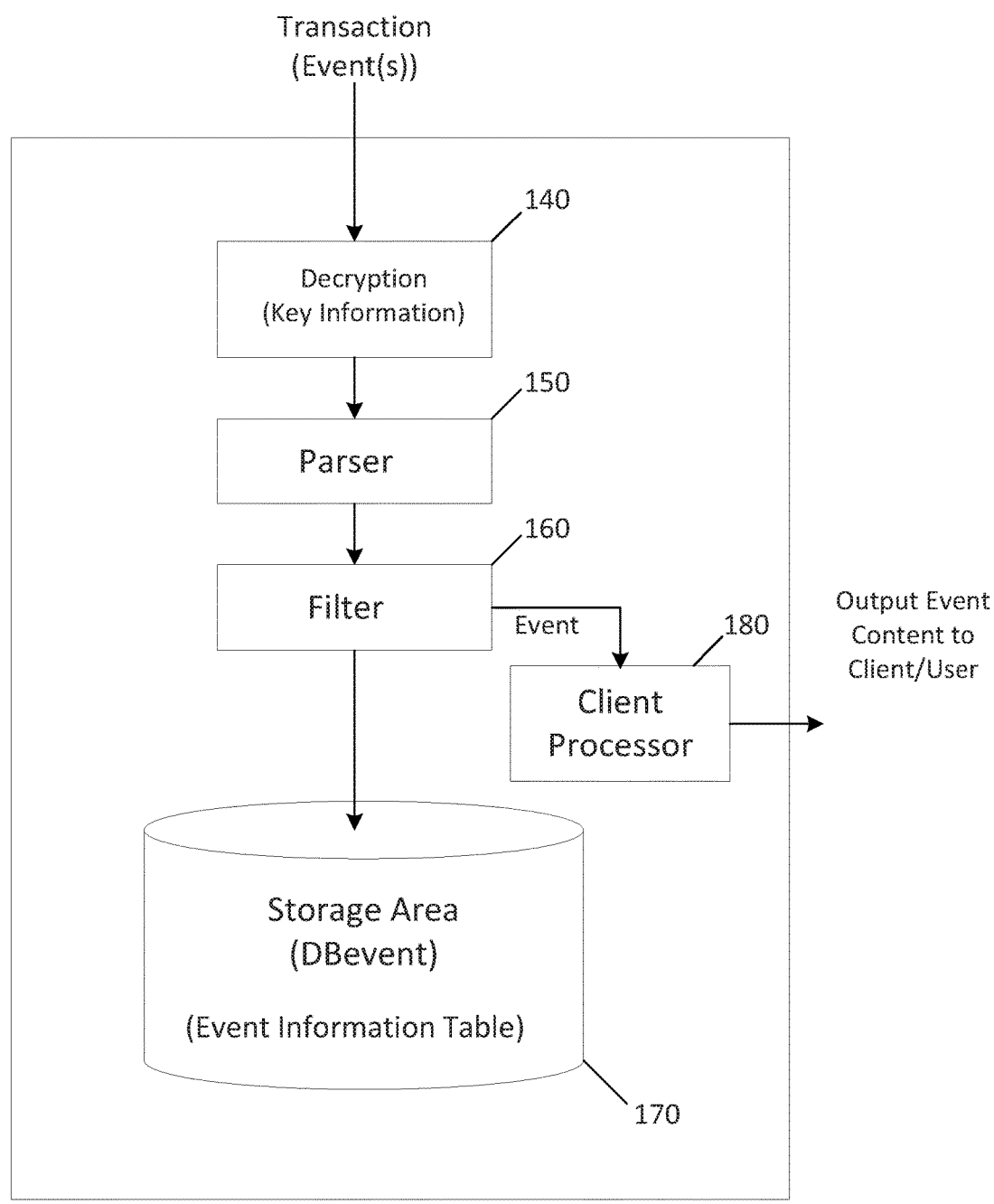
FIG. 2 illustrates a network diagram of a component operating with a database, according to example embodiments.

FIG. 2 illustrates a logic diagram 138 for recovering an event of a subscriber client or user transmitted received in the blockchain network, according to example embodiments. This diagram may correspond, for example, to node N2 of FIG. 1B or may correspond to a client (e.g., client 135) coupled to node N2. In either case, both nodes N2 and N3 effectively "listen" to the network for purposes of receiving events, but of the two nodes N2 and N3 only N2 and/or its attendant clients/users can access and read the event in this example.

Referring to FIG. 2, the first peer node N1 sends (or publishes) the event (e.g., as a transaction as previously described) in the network. The event is received by both peer nodes N2 and N3, but only operations at node N2 will be discussed at this point. The event may be one which is not meant to be read by all clients, or users, in the network, e.g., the event may be a secret (e.g., encrypted) event or one having some level of restriction. The restriction may simply be out of the convenience of users who have no interest in the content of the event or may be one having a higher level of security or privacy concern. Additionally, or alternatively, the event may be published upon the occurrence of one or more predetermined conditions, e.g., when node N1 commits a new block to the blockchain. The new block may be related to or otherwise of interest to clients or users which are registered or subscribed to receive events corresponding to the subject matter (transaction) of the new block.

The first peer node N1 is associated with a validator, which, for example, as in all embodiments herein, may be a user, client, administrator, owner of the first peer node, application, or another network entity that authorizes creation or transmission of an event. The event may be created and prepared for transmission in accordance with chaincode 124 of the smart contract associated with the first peer node N1, as shown in FIG. 1A. The chaincode supplies event information that conforms to a certain format with specific fields that enable the event to be filtered out or accessed on the side of the second peer node N2.

The second peer node N2 is coupled to client 135 through a receiver. The receiver may be, for example, a type of interface that delivers or otherwise controls transmission of events and other information between the node N2 and client 135. The client 135, or one or more of its users, may have previously registered with a network entity to receive events from the validator. (In one embodiment, this may have resulted in the client 135 receiving key information for decryption of a transaction or block for purposes of accessing the event).

In one embodiment, the second node N2 may access the notification list 105a (e.g., see FIG. 1A) indicating whether the client 135 is registered (or subscribed) to receive events from the validator. The notification list 105a may, for example, be used by node N2 to send an event to the client 135, but the processing operations performed in the client may control whether the event content is accessed by a user of the client, and in some cases whether the user is even notified that the event has been received. The client 135 may be, for example, a computer, workstation, mobile terminal, application, or entity in the blockchain network.

The client 135 includes, or is coupled to, decryption logic 140, a parser 150, a filter 160, a storage area 170, and a processor 180. The decryption logic 140 decryptions the transaction in the block based on subscriber key information previously received. The parser 150 may be coupled between the decryption logic 140 and filter 160 to extract information from fields of the event for use by the filter. The filter 160 filters out the event if the user of the client 135 is not intended to receive events from the validator. The storage area 170 (e.g., a database or memory) stores an event information table to be used by the filter 160 to pass or block an event.

In one embodiment, the processor 180 may perform decryption, instead of decryption logic 140, as well as other operations for purposes of recovering the content of the event for output to the user of the client 135. The client may be the only intended recipient of an event from the validator or may be one of many clients (or users) of the second peer node and/or other nodes in the network intended to receive events from the validator. In one embodiment, the processor of the client may be considered to correspond to all the features in box 150 of FIG. 2.

Confidential Chaincode Side

The chaincode that generates events having a secret status may perform operations using an event counter for performing event management. The event counter may increase every time a new event is generated or distributed by the chaincode to one or more corresponding clients (or users) registered in the network to receive such events. In one embodiment, the chaincode may compute an event identifier based on (i) the value of the counter at the time the event is to be generated or distributed and (ii) a secret key received from the creator of the event (at deployment time). The creator of the event (e.g., event source or validator) may be, for example, another user or client in the blockchain network or a node or other device that initiates deployment of an event when one or more conditions are satisfied. The event identifier may be used as label attached and incorporated into the event ciphertext.

Client Side

In order to receive messages in the blockchain network, the user (or client) must be added to the second peer node and then register to receive messages from the validator. The user (or client) may be added to the second peer node in accordance with a policy associated with that node or the blockchain network. The policy may require the client to receive identifying credentials, for example, from the network in association with a membership service provider. The identifying credentials may be generated from a certificate authority, which determines the rights the user (or client) in the network.

Once the user (or client) has been added to the second peer node, the user (or client) may register to receive custom (e.g., secret) events from the validator. Registration may be performed, for example, by adding the identifying credentials of the user or client (as indicated, for example, by a digital certificate) to an event notification list maintained by the second peer node. In some cases, the identifying credentials may also be added to first peer node and/or one or more other network entities. In one embodiment, the identifying credentials may be assigned to the user (and/or client) by an administrator of an owner of the second peer node, who, for example, may have communicated with the validator beforehand to receive key or other information to access events. The event notification list may identify a subset of users (and/or clients) in the network that are to receive custom events, or other type of messages, from the validator.

The client may, as previously indicated, include or have access to a storage area that stores information to assist in performing event management. In one case, the information may include database event information (DBevent). The database event information may indicate, for example, the identity of the chaincode responsible for generating and sending an event and the status of the event.

In one embodiment, the database event information (DBevent) may be expressed in the form of a table. Entries in the table may include, for example, [chaincode-id, event-secret, next-event-id, counter-value(, max-event-number)]. The label "chaincode-id" indicates the identity of the chaincode for the event. The label "event-secret" indicates the status of the event (in this case, secret). The label "next-event-id" is a hashed-based message authentication code (HMAC) of the counter value of the next event to be sent by the chaincode of the validator. The label "counter-value(, max-event-number)" indicates a predetermined maximum number of events for the corresponding chaincode. In one embodiment, the max-event-number may be reset by the chaincode and reflected in the table after the maximum number of events has been sent or received.

The event information table may arrange the database event information in various ways. One way involves designing the table to have one entry for each chaincode that manages custom (secret) events a corresponding user is registered to read. In one embodiment, each chaincode may control the generation and distribution of custom events from the same validator, or the table may store different chaincode of different validators for events the user is registered to read.

The client may use or be coupled to a filter that determines whether the client is eligible to access and read an event transmitted or broadcast on the network. One example of such a filter is a bloom filter. In one embodiment, the bloom filter may include binary strings used to determine whether an item is in a set, and in this case whether a received event is intended to be accessed by a registered user (or subscriber) of the client. Compared to other techniques for determining set membership, bloom filters have nominal storage requirements and produce an accurate and quick result. Also, bloom filters also do not produce false negatives.

In one case, a bloom filter for a client (e.g., filter 160 in FIG. 1) may be formed based on the entries of one column in the event information table. For example, the table may have one entry for each confidential chaincode used to generate events a user of the client is registered to read. An example of such a table is shown in FIG. 3C. In this example, the table includes three entries corresponding to the chaincode of three confidential smart contracts, respectively, that control the generation and distribution of messages on the network. The first, second, and third chaincode may generate events for the same validator at the same or different nodes, or from different validators at different nodes. The entries for each chaincode are aligned along respective rows of the table, and the columns of the table correspond to information sent in association with events. In one embodiment, the information in one or more of the column corresponds to event identifiers or labels, as well as other information.

The bloom filter may be constructed based on information in one of the columns of the table. In one embodiment, the bloom filter may be formed based on information in the "next-event-id" column for the chaincode identified in the table. The "next-event-id" may equal a hash of the counter value corresponding to events transmitted by the chaincode in the blockchain network, e.g., next-even-id=HMAC (event-secret, counter-value).

For example, consider the case where the table is registered to receive events from the chaincode of three smart contracts, corresponding to respective validators in the blockchain network. The chaincode for these validators may store respective counter values X1, X2, and X3, e.g., the first chaincode has sent X1 messages to corresponding registered users in the past, the second chaincode has sent X2 messages to corresponding registered users in the past, and the third chaincode has sent X3 messages to corresponding registered users in the past. (In some embodiments, the clients may be registered to receive events along with or in place of users)

The bloom filter may use the hash values for the most recent counter values for the first, second, and third chaincode, plus 1, in the "next-event-id" column of the client table. As previously indicated, the hash values may be (HMAC) counter values. Thus, for example, if the client has received X1 messages from the first chaincode in the past, the client table stores HMAC(event_secret_1, X1+1), which corresponds to a hash of (X1+1) in the "next-event-id" column for the first chaincode, because the next event to be transmitted by the first chaincode will have a counter value of (X1+1). Similarly, the client table stores HMAC (event_secret_1, X2+1) and HMAC(event_secret_1, X3+1), which correspond to hashes of (X2+1) and (X3+1) in the "next-event-id" column for the second and third chaincode, respectively. These values are hashed because the next events to be transmitted by the second and third chaincode will have counter values of (X2+1) and (X3+1), as shown in FIG. 3D.

In one embodiment, the bloom filter may be constructed so that the hash values are only valid if the number of set bits (ones) in the hashes is always less than or equal to a predetermined maximum counter value, e.g., "max-event-number" in counter-value(, max-event-number)] as previously discussed.

The hash values of the bloom filter (X1+1), (X2+1), and (X3+1) are generated using the same hashing algorithm(s) used by the first, second, and third chaincode. In operation, a node which receives an event sends the event to the bloom filter for a corresponding client. A parser (e.g., parser 155 in FIG. 1B) parses the event and extracts the hash value in a field of the event corresponding to "next-event-id." This hash value is then sent to the bloom filter for comparison to the hash values HMAC(event_secret_1, X1), HMAC (event_secret_2, X2), and HMAC(event_secret_3, X3). If there is no match, then it is determined that the event is not intended to be read by the user of the client because the client is not registered to receive secret events from the validator. The event is therefore filtered out and is not able to be read by the user.

In one embodiment, a non-matching event may be filtered out by the client in a manner transparent to the user, e.g., without the unregistered user ever knowing from which validator the message was sent or even that a message was even transmitted in the network by the validator. A client operating in this manner, therefore, maintains the privacy of the validator because unregistered users are not only restricted from reading the event, they do not even know that an event was sent from the validator. This provides an extra level of privacy in the network.

If the hash value parsed from the received event matches one of the hash values of the bloom filter, then it is concluded that the user is registered to read secret events from the validator. The event, therefore, is authorized for decryption by the client (e.g., by processor 180 in FIG. 1B) and output in a form readable or otherwise accessible by the user. Decryption may be performed based on a private key previously sent by the validator to the client, for example, in an off-line communication. Additionally, the counter value corresponding to the chaincode in the event information table (DBevent) is incremented by one, a new HMAC hash value is computed based on the incremented counter value, and the new hash value is stored in the "next-event-id" column of the client table for that chaincode.

Additional confidentiality may be provided, for example, by having the chaincode of different validators use different hash algorithms and/or different encryption keys. Also, because validators often send different numbers of messages at different times, the counter values in the event information table of a client may all be expected to be different, thereby adding another layer of security even if the same hash algorithm is used by two or more validators. In one embodiment, the client (or its corresponding node) may maintain a separate table with respect to event labels (next-event-id).

Figure 3A:
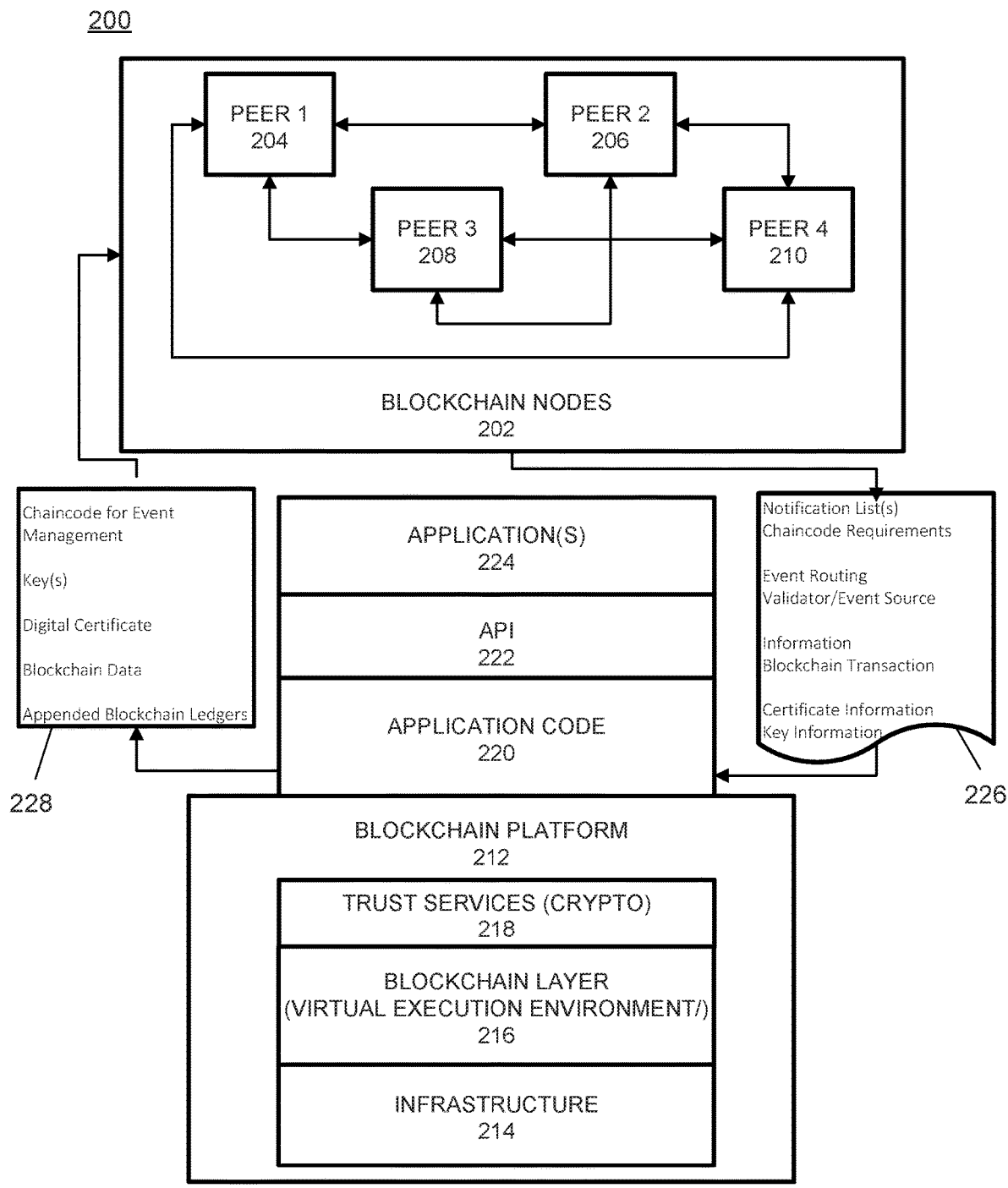
FIG. 3A illustrates an example peer node configuration, according to example embodiments.

FIG. 3A illustrates a blockchain architecture configuration 200, according to example embodiments. Referring to FIG. 3A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 3A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

For example, information 226 relating to the generation, distribution, accessibility, and management of events may be processed by one or more processing entities (e.g., virtual machines) included in the blockchain layer 216. The processing may include, but is not limited to, generating or maintaining notification lists of clients registered or otherwise eligible to receive various types of events in the system, setting chaincode requirements or policies for nodes in order to manage event access and distribution, validator information for event origination, and information relating to the authorization and distribution of certificates and/or keys to enable the clients to receive events, as well as information relating to blockchain transactions.

The result 228 may include chaincode for event management at the node level, key and/or certificates to be sent to relative nodes to allow for receipt of events, blockchain data or transaction reflecting the appending of blocks relating to the distribution of events in the network, and also copies of the blockchain ledger for distribution to nodes in the system. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

In FIG. 3A, information relating to blockchain transactions for events may be received, along with requests for and updates to chaincode for use at nodes to perform event management and other features as set forth in box 226. One function may be to output the chaincode, along with the other information as indicated in box 228, to one or more of the nodes 204-210, which may include, for example, one or more of nodes N1, N2, and N3 previously discussed.

Figure 3B:
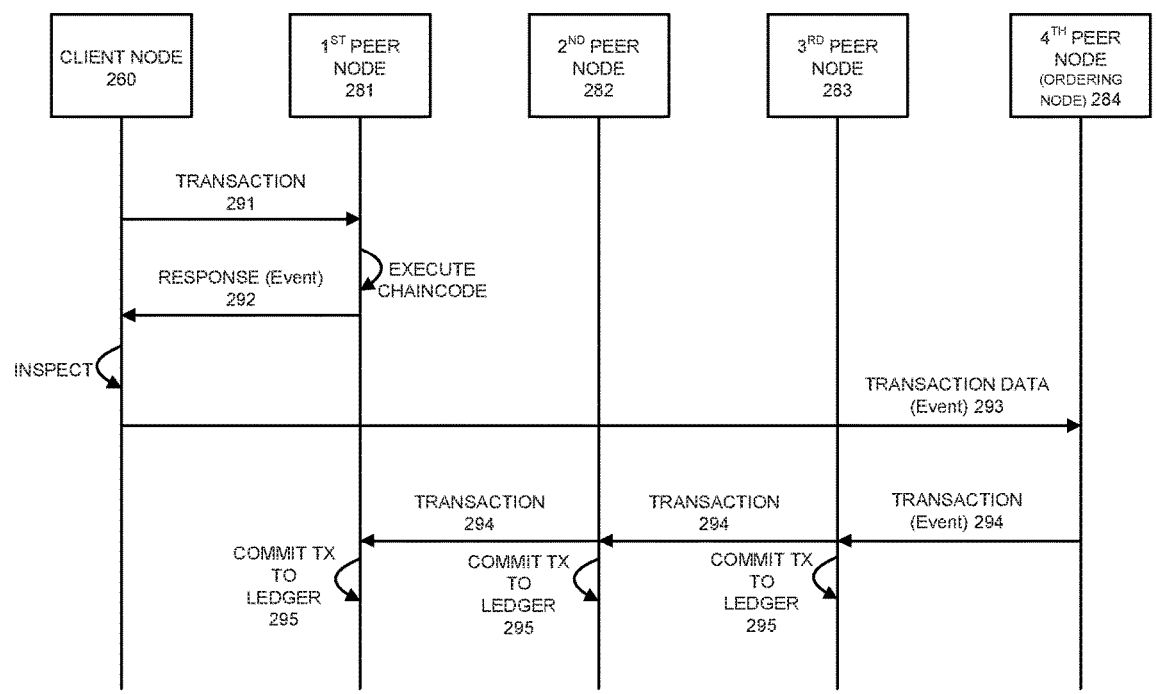
FIG. 3B illustrates a further peer node configuration, according to example embodiments.
Figure 3D:
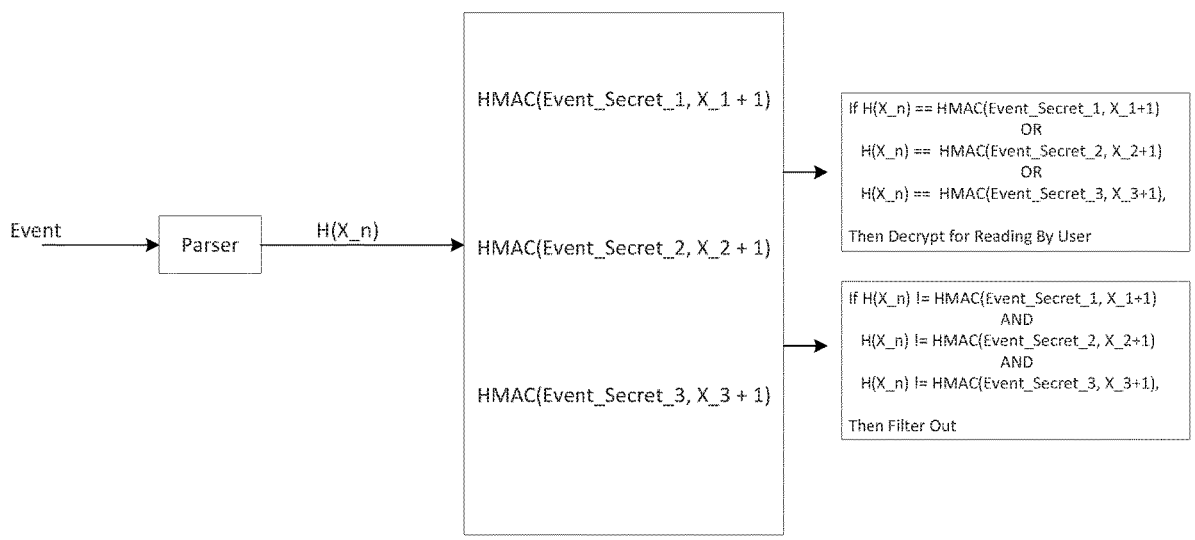
FIG. 3D illustrates an embodiment of a filter.

FIG. 3B illustrates an example of a transactional flow 250 between nodes of the blockchain in accordance with an example embodiment. Referring to FIG. 3B, the transaction flow may include a transaction proposal 291 sent by an application client node 260 to an endorsing peer node 281. The endorsing peer 281 may verify the client signature and execute a chaincode function to initiate the transaction, which may include generation of an event from a corresponding validator. The output may include the chaincode results, a set of key/value versions that were read in the chaincode (read set), and the set of keys/values that were written in chaincode (write set). The proposal response 292 (e.g., the event) is sent back to the client 260 along with an endorsement signature, if approved. The client 260 assembles the endorsements into a transaction (event) payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 3B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293, the client 260 assembles endorsements into a transaction (including an event) and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 (including the event) within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295, each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

FIG. 3C illustrates an example of an event information table 350 that shows a bloom filter for a client (e.g., filter 160 in FIG. 1) may be formed based on the entries of one column in the event information table. For example, the table may have one entry for each confidential chaincode used to generate events a user of the client is registered to read. In this example, the table includes three entries corresponding to the chaincode of three confidential smart contracts, respectively, that control the generation and distribution of messages on the network. The first, second, and third chaincode may generate events for the same validator at the same or different nodes, or from different validators at different nodes. The entries for each chaincode are aligned along respective rows of the table, and the columns of the table correspond to information sent in association with events. In one embodiment, the information in one or more of the column corresponds to event identifiers or labels, as well as other information.

The bloom filter may be constructed based on information in one of the columns of the table. In one embodiment, the bloom filter may be formed based on information in the "next-event-id" column for the chaincode identified in the table. The "next-event-id" may equal a hash of the counter value corresponding to events transmitted by the chaincode in the blockchain network, e.g., next-even-id=HMAC (event-secret, counter-value).

For example, consider the case where the table is registered to receive events from the chaincode of three smart contracts, corresponding to respective validators in the blockchain network. The chaincode for these validators may store respective counter values X1, X2, and X3, e.g., the first chaincode has sent X1 messages to corresponding registered users in the past, the second chaincode has sent X2 messages to corresponding registered users in the past, and the third chaincode has sent X3 messages to corresponding registered users in the past. (In some embodiments, the clients may be registered to receive events along with or in place of users)

The bloom filter may use the hash values for the most recent counter values for the first, second, and third chaincode, plus 1, in the "next-event-id" column of the client table. As previously indicated, the hash values may be (HMAC) counter values. Thus, for example, if the client has received X1 messages from the first chaincode in the past, the client table stores HMAC(event_secret_1, X1+1), which corresponds to a hash of (X1+1) in the "next-event-id" column for the first chaincode, because the next event to be transmitted by the first chaincode will have a counter value of (X1+1). Similarly, the client table stores HMAC (event_secret_1, X2+1) and HMAC(event_secret_1, X3+1), which correspond to hashes of (X2+1) and (X3+1) in the "next-event-id" column for the second and third chaincode, respectively. These values are hashed because the next events to be transmitted by the second and third chaincode will have counter values of (X2+1) and (X3+1), as shown in FIG. 3D.

FIG. 3D illustrates an embodiment of a filter 360. In one embodiment, the bloom filter may be constructed so that the hash values are only valid if the number of set bits (ones) in the hashes is always less than or equal to a predetermined maximum counter value, e.g., "max-event-number" in counter-value(, max-event-number)] as previously discussed.

The hash values of the bloom filter (X1+1), (X2+1), and (X3+1) are generated using the same hashing algorithm(s) used by the first, second, and third chaincode. In operation, a node which receives an event sends the event to the bloom filter for a corresponding client. A parser (e.g., parser 155 in FIG. 1B) parses the event and extracts the hash value in a field of the event corresponding to "next-event-id." This hash value is then sent to the bloom filter for comparison to the hash values HMAC(event_secret_1, X1), HMAC (event_secret_2, X2), and HMAC(event_secret_3, X3). If there is no match, then it is determined that the event is not intended to be read by the user of the client because the client is not registered to receive secret events from the validator. The event is therefore filtered out and is not able to be read by the user.

In one embodiment, a non-matching event may be filtered out by the client in a manner transparent to the user, e.g., without the unregistered user ever knowing from which validator the message was sent or even that a message was even transmitted in the network by the validator. A client operating in this manner, therefore, maintains the privacy of the validator because unregistered users are not only restricted from reading the event, they do not even know that an event was sent from the validator. This provides an extra level of privacy in the network.

If the hash value parsed from the received event matches one of the hash values of the bloom filter, then it is concluded that the user is registered to read secret events from the validator. The event, therefore, is authorized for decryption by the client (e.g., by processor 180 in FIG. 1B) and output in a form readable or otherwise accessible by the user. Decryption may be performed based on a private key previously sent by the validator to the client, for example, in an off-line communication. Additionally, the counter value corresponding to the chaincode in the event information table (DBevent) is incremented by one, a new HMAC hash value is computed based on the incremented counter value, and the new hash value is stored in the "next-event-id" column of the client table for that chaincode.

Additional confidentiality may be provided, for example, by having the chaincode of different validators use different hash algorithms and/or different encryption keys. Also, because validators often send different numbers of messages at different times, the counter values in the event information table of a client may all be expected to be different, thereby adding another layer of security even if the same hash algorithm is used by two or more validators. In one embodiment, the client (or its corresponding node) may maintain a separate table with respect to event labels (next-event-id).

Figure 4:
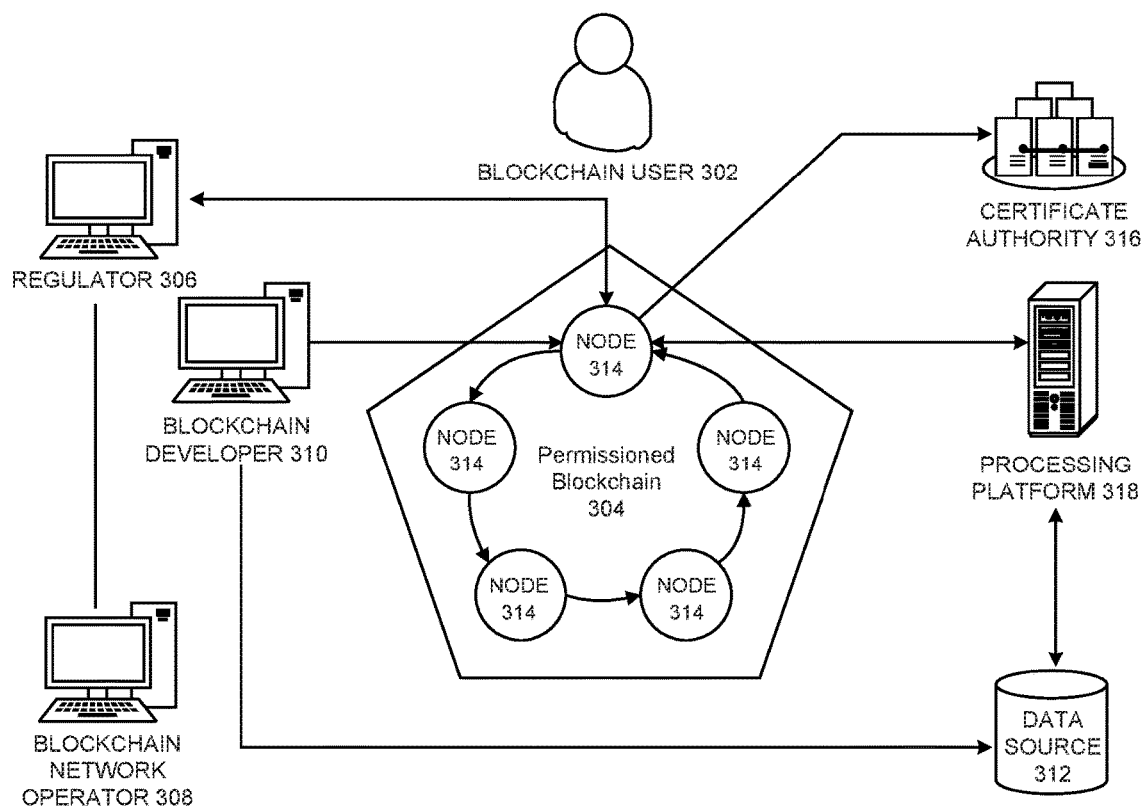
FIG. 4 illustrates a permissioned network, according to example embodiments.

FIG. 4 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the blockchain network processor 332 through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 5A:
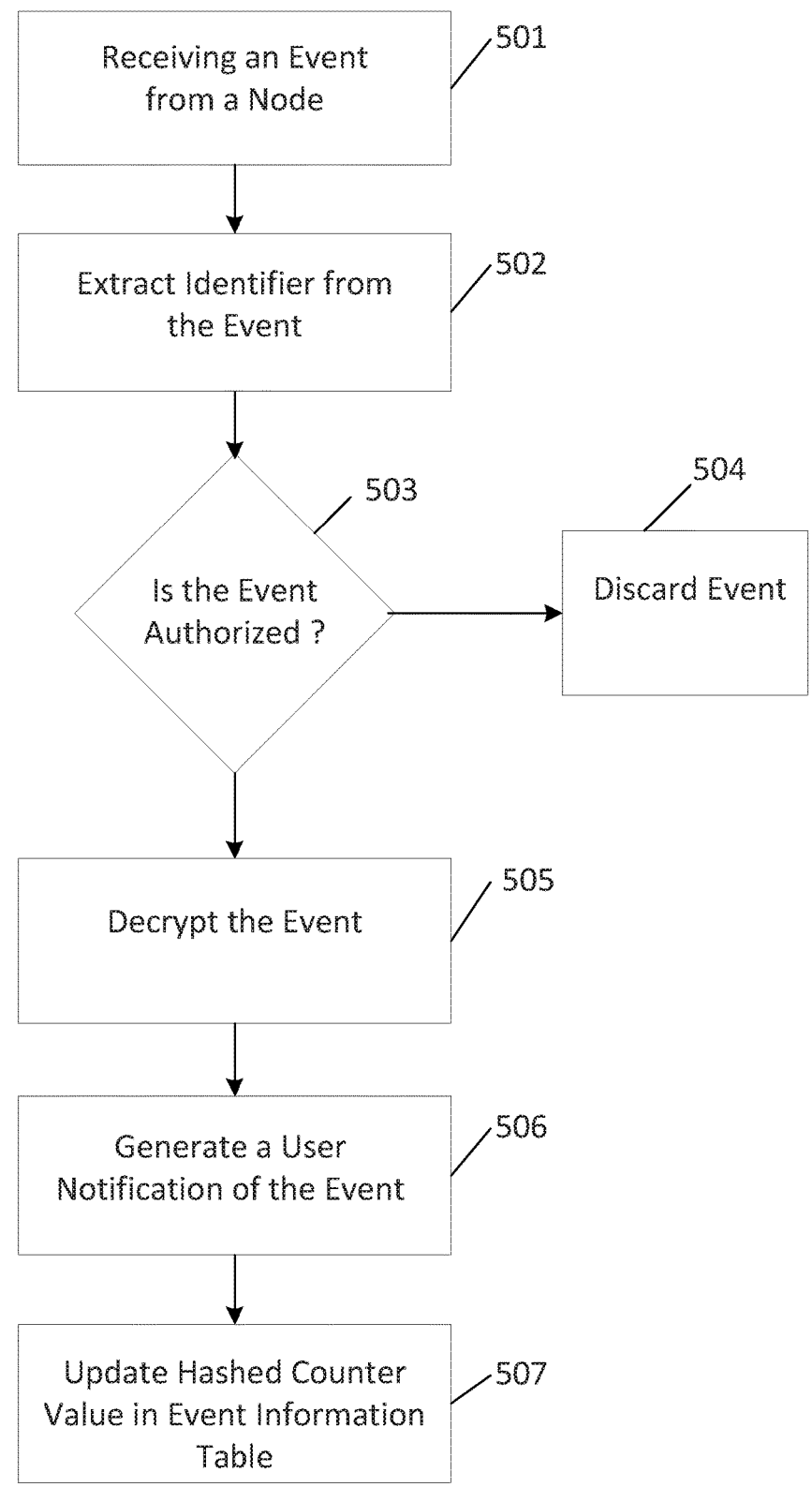
FIG. 5A illustrates a flow diagram, according to example embodiments.

FIG. 5A illustrates a flow diagram 500 of a method of performing event management in a blockchain, according to example embodiments. In this embodiment, event management is performed to allow events (e.g., custom events or other messages created by validators when predetermined conditions are met) of confidential chaincode to be readable only by users of clients authorized to decrypt a state of the chaincode. As described, this may be accomplished by generating privacy-preserving event identifiers which allow intended recipients (e.g., authorized clients or users) to efficiently track authorized events. In one implementation, the method may be performed in a manner transparent to unregistered users in the blockchain network, e.g., unregistered users are not even aware or notified of the events.

Referring to FIG. 5A, the method 500 may be understood, for example, with reference to other drawings of the application. The method 500 includes, at 501, receiving an event from a node. The event may have some form of restricted status in that it is not intended to be accessed by all users or clients in the blockchain network. The message may be universally broadcast to all nodes in the blockchain network, but the content of the message may not accessible by all of the users and clients, but only those registered (e.g., as subscribers) in a notification list accessed by a recipient node in the network.

Transmission of the event may be performed by a client of the validator through a corresponding node. The event may be received by another node or an entity in the network different from a node, e.g., a regulator, processing platform, certificate authority, or other blockchain device or application.

At 502, an identifier is extracted from a predetermined field of the event, for example, by parser 155 in FIG. 2. The identifier may be a hashed (HMAC) value of an event counter at the node or client that originated and authorized transmission of the event. In effect, then, the hashed value of the event counter may provide an indication of a state of the confidential chaincode used to control generation and transmission of the event.

The event counter may count a number of events transmitted for receipt by users of clients on the notification list. The counter may be reset to an initial value when, for example, a predetermined maximum count value is reached. The counter reset, as well as other operations to generate and transmit the event, may be controlled by the chaincode of a client of the transmitting node and information from the associated validator. Chaincode at the client node that receives the event may control a similar reset in relation to the hashed values stored in the event information table. In one embodiment, the identifier extracted from the event may include additional information, such as but not limited to a chaincode-id and event-secret status.

At 503, an analysis is performed to determine whether the event is an authorized event. An event may be considered to be authorized, for example, when the client, user, or other receiving entity is intended to receive the event as indicated by the notification list. In one embodiment, the event may be authorized if the receiving entity has the same confidentiality level as the event e.g., as the event-secret information, has matching key information to decrypt the event, and/or equivalent hash values.

In one embodiment, the analysis performed to determine authorization of the event may include comparing the HMAC counter value in the event to information in the event information table accessed by the client of the receiving node. As previously indicated, one embodiment of the event information table includes HMAC event counter values maintained by various chaincode.

In operation, an application, chaincode, or processor of the client compares the HMAC value of the event counter, extracted from the identifier of the received event, to the HMAC value of the next-event-id column entry corresponding to the chaincode which controlled transmission of the event. When the identifier hashed counter value matches the hashed value in the table for the corresponding chaincode, the event is considered to be authorized. This comparison may be performed, for example, by the bloom filter previously discussed.

At 504, when the identifier hashed counter value does not match the hashed value in the table for the corresponding chaincode, the event is not authorized. This means that the client was not meant to read the event. In this case the event is discarded, e.g., deleted, and thus no change is made to the information in the event information table. In one embodiment, the event may be discarded in a manner transparent to the client, e.g., without providing notification to the client that the event was ever received. This may increase the processing speed and efficiency of event management at the nodes of the blockchain network, while at the same time increasing confidentiality of secret messages.

At 505, after the event is authorized, the event may be decrypted, for example, based on a private key which the client had previously received from the validator, a certificate authority, or another network entity.

At 506, once the event is decrypted, a notification of the event may be generated to inform one or more users of the client that an event has been received and of the chaincode (or validator, client, user, or other network entity) that sent the event. The content of the event may then be output for reading by the registered user of the client, either automatically or in response to a client request to read the content of the event. In one embodiment, each user of the client may be required to have a certificate and key and must be registered on the notification list (which the client may access) before the content of the message can be read by the user. The event may include, for example, text, images, video, records, or any other information of the blockchain network intended for a subset of clients or users indicated, for example, in the notification list.

At 507, after the event is authorized, the hashed value of the event counter in the event information table may be updated to correspond to a next value of the event counter. This next counter value may then be hashed and stored as a new entry in the next-event-id column of the corresponding chaincode id.

Figure 5B:
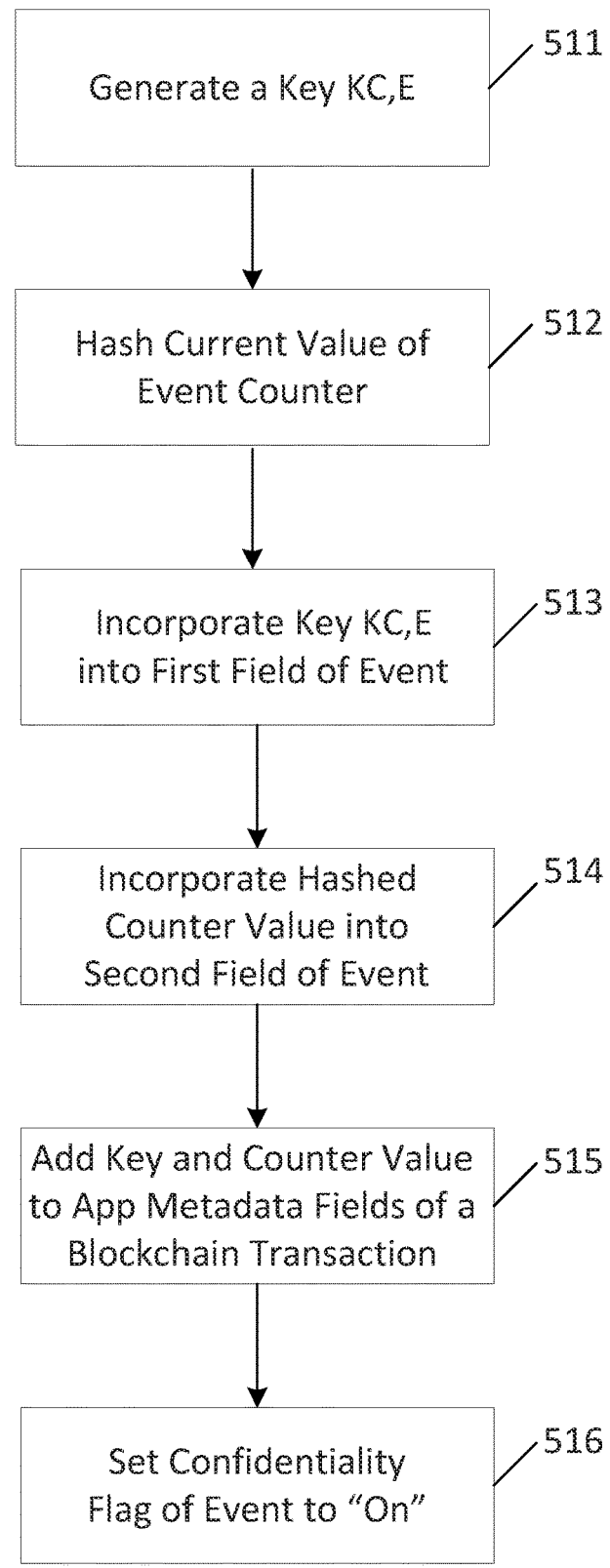
FIG. 5B illustrates a further flow diagram, according to example embodiments.

FIG. 5B illustrates an embodiment of a method 510 of invoking the deployment of an event in the network. One or more operations of the method may be performed by chaincode, that controls the generation and transmission of the event from one node for access by clients or users at one or more other nodes. The clients or users that are to access the event may be ones, for example, registered to receive the event on a notification list maintained by corresponding network nodes. The method may be initiated by a network entity, such as a client, user, validator, who prepares or otherwise designates the content of the event.

Referring to FIG. 5B, the method 510 includes, at 511, generating a key KC,E to be used to encrypt the event. The key may be, for example, a public key obtained from a certificate authority of the blockchain network. In one embodiment, the public key may be a randomly generated key.

At 512, the current value of an event counter is hashed using a predetermined algorithm that correspond to the algorithm used to hash the next-event-id counter values stored in the event management tables of clients registered to receive the event.

At 513, the public key generated in 511 is incorporated, by the chaincode, into a first field of a message corresponding to the event.

At 514, the hashed counter value <C,E> is incorporated into a second field of the event message by the chaincode. The second field may be, for example, a code-metadata field of the event message, e.g., the hashed value of the current counter value may include a hashed-based message authentication code (HMAC). Initially, the event counter may be set to an initial value (e.g., 0). Then, the event counter may be incremented each time the chaincode is used to distribute another event to registered clients or users. The key and hashed counter value may be passed to the chaincode at the time the chaincode is executed. The hashed counter value may correspond to an identifier for the event, to allow a receiving client to determine whether access to the event is authorized. (In one or more embodiments, the terms client and user may be used interchangeably and may be synonymous with one another.)

At 515, the public key and/or hashed counter value <C,E> are added to one or more app-metadata fields of a blockchain transaction that authorized clients can read. In one embodiment, the hashed counter value may be encrypted using an encryption key of an authorized user.

At 516, a confidentiality flag of the transaction is set, by the chaincode, to an "on" value, and the metadata fields (e.g., the event message) are encrypted. Setting the confidentiality flag to an "on" value indicates that the event has secret or confidential status, e.g., event-secret. As with other operations, the chaincode may perform the encryption.

The client (or validator) deploying an event may communicate information to clients registered to receive events from corresponding chaincode or to other network entities authorized to receive the events of the chaincode. This may take place, for example, offline or out of network between the client invoking the chaincode to deploy the event and the other registered clients or entities. The information may include keys and/or other data that will allow the registered clients and entities to decrypt later event messages. In one embodiment, an event-secret status for the events deployed by the chaincode may be communicated to the registered users and other authorized entities, if any.

Chaincode Invocation

Figure 5C:
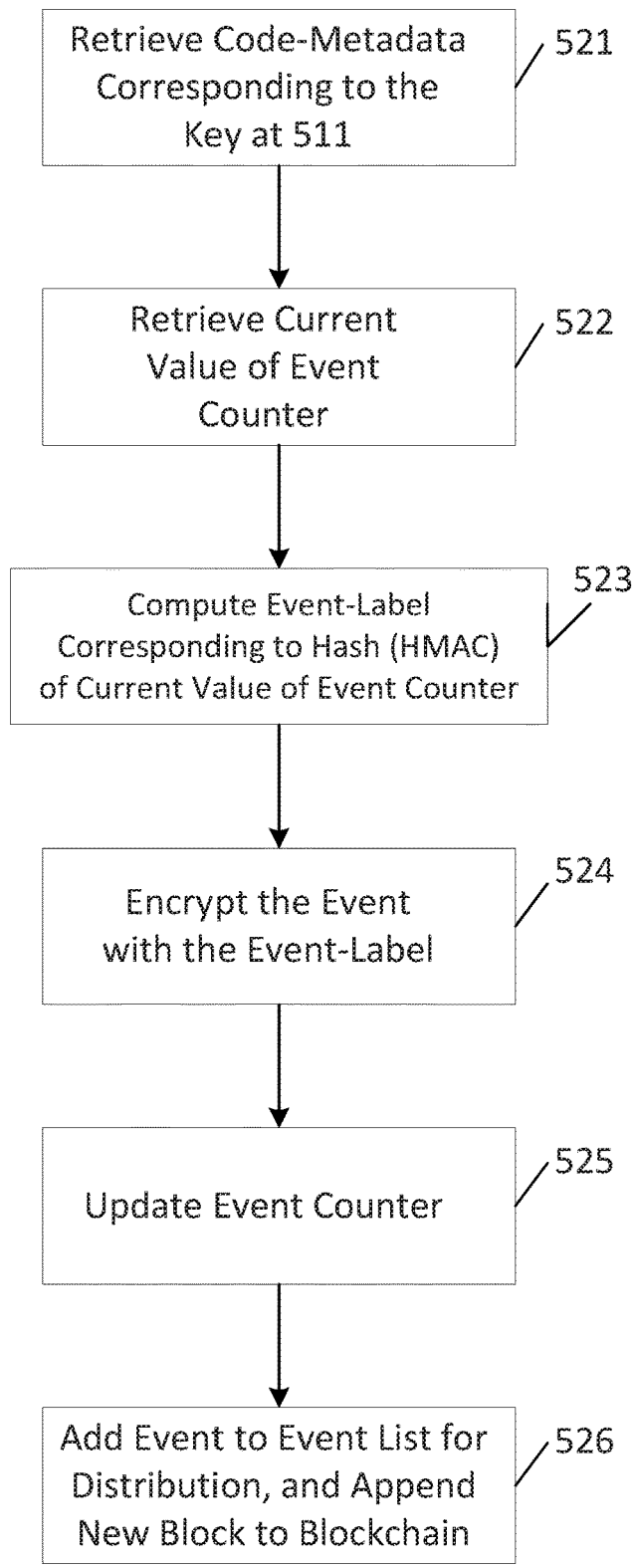
FIG. 5C illustrates a further flow diagram, according to example embodiments.

FIG. 5C illustrates an embodiment of a method 520 of chaincode invocation for generating and transmitting an event in the blockchain network. The method includes, at 521, retrieving the code-metadata KC,E, for example, from a storage device. The code-metadata may include the public key generated at 511.

At 522, the chaincode retrieves the current value of the event counter (evctr).

At 523, the chaincode computes an event-label<-HMAC_KC,E(evctr). The event-label may be a hash (HMAC) value of the current value of the event counter. The hash is computed using a predetermined hash algorithm, which is used to generate the hash value in the next-event-id column corresponding to the chaincode of the event information table of a registered client.

At 524, the chaincode encrypts an actual event (e.g., content of the event message) using a predetermined mode of operation for symmetric key cryptographic block ciphers. One example mode of operation is Galois/Counter Mode (GCM), which is an authenticated encryption algorithm that provides both event authenticity (integrity) and confidentiality. The chaincode may encrypt the actual event in GCM mode with a state key KS and a label. The state key KS may be passed in deployment of confidential chaincode for state encryption, and the label may be the "event-label" discussed in 523.

At 525, the chaincode may updated the event counter, for example, by incrementing the counter value by 1, e.g., evctr=evctr+1.

At 526, a validator adds the event to a list of custom events that are to be announced after the transaction corresponding to distribution of the event is committed (in an appended block) to the blockchain network.

Figure 5D:
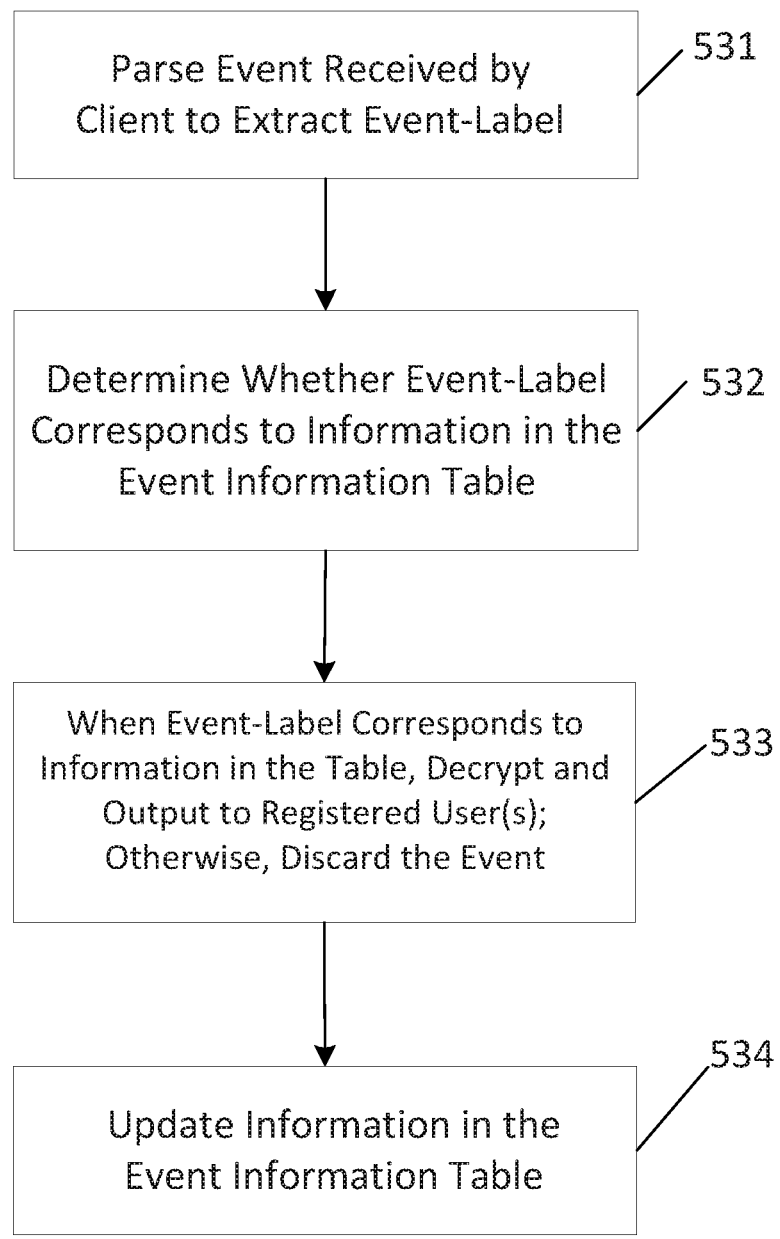
FIG. 5D illustrates a further flow diagram, according to example embodiments.

FIG. 5D illustrates an embodiment of a method 530 of processing an event received by a client in the blockchain network. In preparation to receive events, the client of each registered user may prepare information corresponding to one or more expected confidential event labels. This information may be stored, for example, in database or table form in a storage device of or coupled to the client. The expected confidential event labels may be included in the event information table (DBevent). As previously discussed, in one or more embodiments, the client may add a next-event-id value for use by a bloom-filter for every chaincode entry in the database.

Referring to FIG. 5D, the method 530 includes, at 531, the client parses an event received at a corresponding node of the network. The event is transmitted from a node of a validator or other client, as previously described. The parsing may be performed to extract an event-label from one or more predetermined fields in the event, which, for example, may include an identifier of the event. The identifier, as discussed, may include the hashed value of the event counter, and in one or more embodiments the identity of the transmitting chain code ("chaincode-id") and the event status ("event-secret").

At 532, the client checks if the event-label extracted from the received event is among events in the database DBevent the client is registered to receive. This may be performed, for example, by passing the event-label (e.g., hashed event counter value of the identifier) through a bloom filter. The bloom filter may perform this checking operation within $O(1)$ operations. If the received event is not among the events stored in the event information table of the database DBevn, then the bloom filter discards the received event, and the client continues with the next event.

At 533, when the received event is not filtered out (e.g., when there is a match of the hashed event counter value with the next-event-id value in the table), the event is decrypted, registered users are notified of the event, and the content of the event is output in a form readable by the registered users.

At 534, the client updates the hashed counter value in the event information table corresponding to the chaincode of the received event. The updated table entry may be indicated as: [chaincode-id, event-secret, next-event-id', counter-value'(, max-event-num)] where counter-value'<-counter-value+1 and next-event-id'<-HMAC(event-secret, counter-value).

Successful Detection of Event

In one embodiment, operation 533 in FIG. 5D may be modified to successfully detect that a received event is intended for the user when the following two requirements are satisfied: (1) event-secret in the database entries o the client matches the secret event-specific key $K_{C,E}$ that is provided to the chaincode and (2) the hashed value of event counter (evnctr) on the chaincode side is the equivalent to the hashed value of the next-event-id of the event counter on the client side. When both of these requirements are satisfied, it is guaranteed that that the computed event-id at both ends (client side and chaincode side) is the same.

Extensions

In one or more embodiments, the operations described herein may be performed in the context of a blockchain where transactions are not linked to specific chaincode. In one or more additional embodiments, the same operations may be used to hide notifications corresponding to different users of the same chaincode, for example, in cases where transactions are linked to a specific chaincode.

Figure 5E:
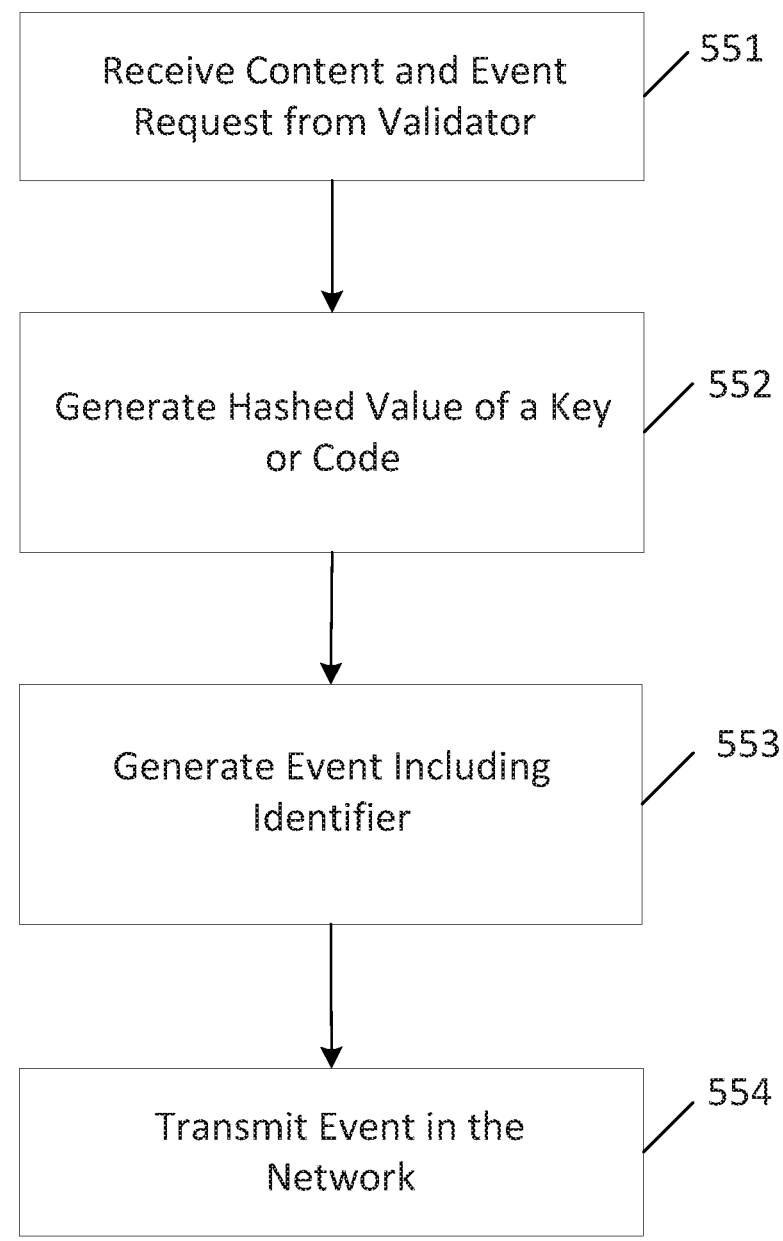
FIG. 5E illustrates a further flow diagram, according to example embodiments.

FIG. 5E illustrates a flow diagram 550 of an example method of generating an event for transmission in a blockchain, according to example embodiments. The method 550 includes, at 551, receiving content with a request to transmit an event from an event source, e.g., a validator. This information may be received by a client of the validator coupled to a node in the blockchain network, e.g., node N1 in FIG. 1A.

At 552, chaincode of the client generates an identifier to be used by registered users in receiving the event. The identifier may be, for example, a hashed value of information associated with the validator. This information may be, for example, a key provided by the validator to encrypt the requested event. In one embodiment, the information may be another type of information such as a time code, a content code, a tracking code, or a code that changes periodically according to a predetermined time schedule and accessible to both the validator node and nodes of registered users. The event information table may store the same hashed value for notifying and allow access to events.

At 553, a processor of the client generates an event based on the information received from the validator and chaincode in 551 and 552. The event has predetermined fields for storing the identifier, identity of the chaincode, status of the event, and/or other information.

At 554, the client transmits or broadcasts the event to the nodes of the network, for access and reading by authorized users in accordance with the embodiments described herein.

Figure 6A:
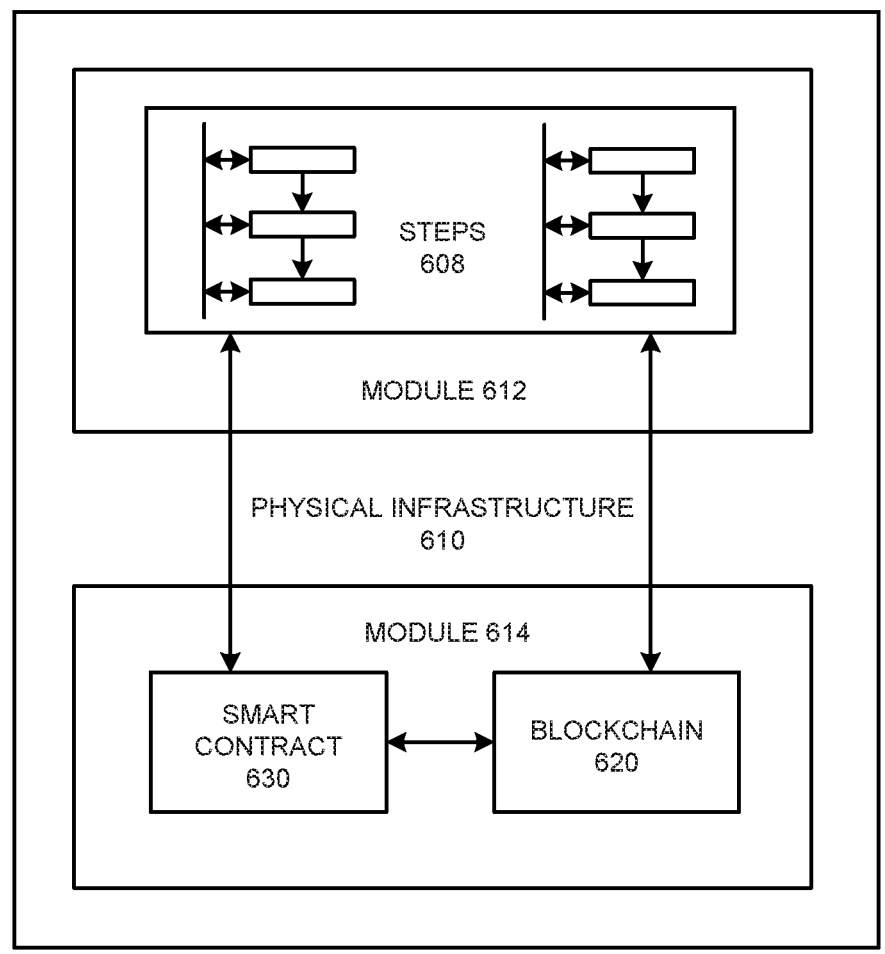
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
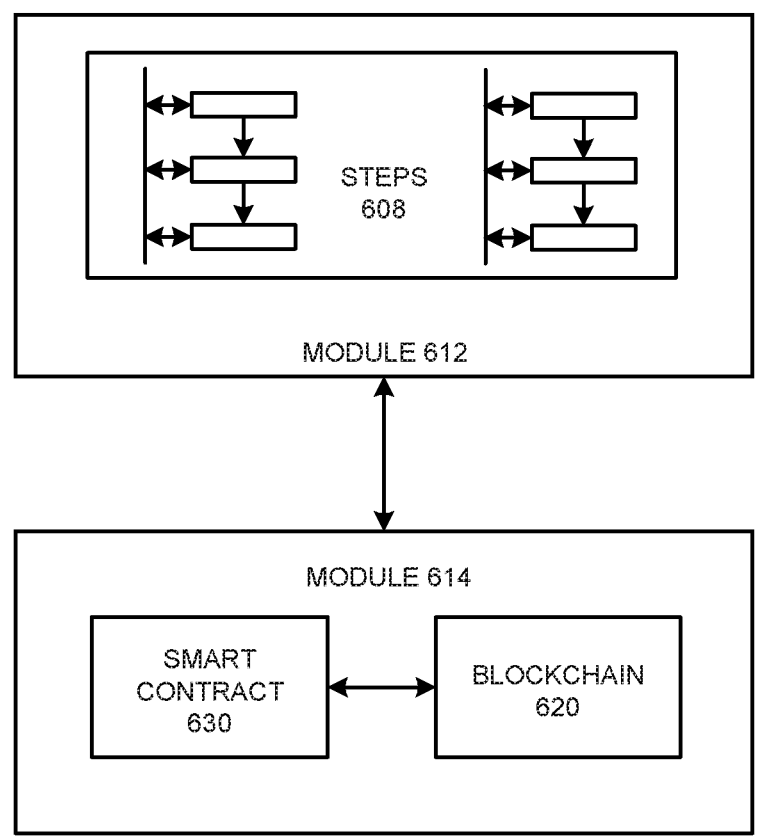
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure, the module 612, and the module 614 may include one or more computers, servers, processors, memories, and/or wireless communication devices. Further, the module 612 and the module 614 may be a same module.

Figure 6C:
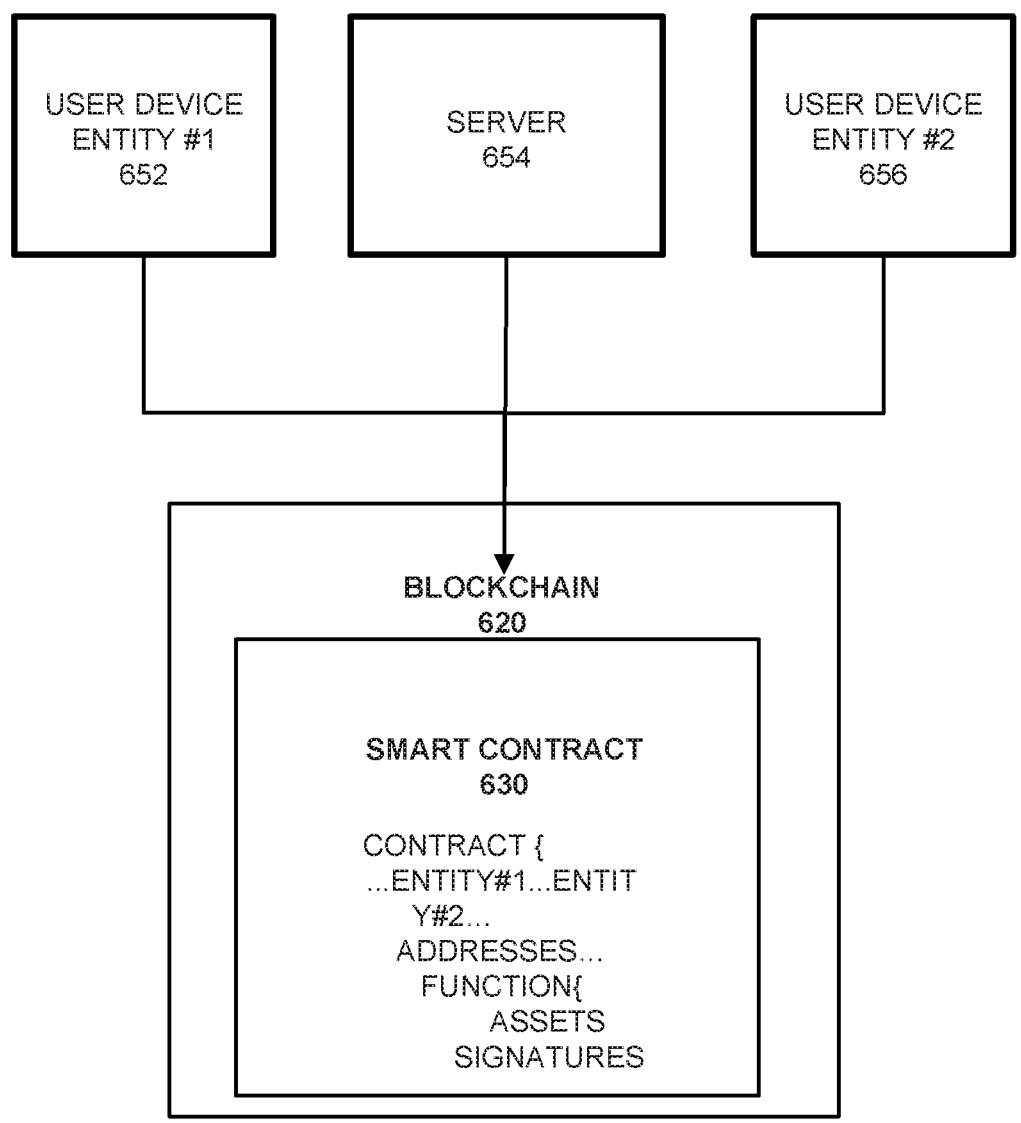
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
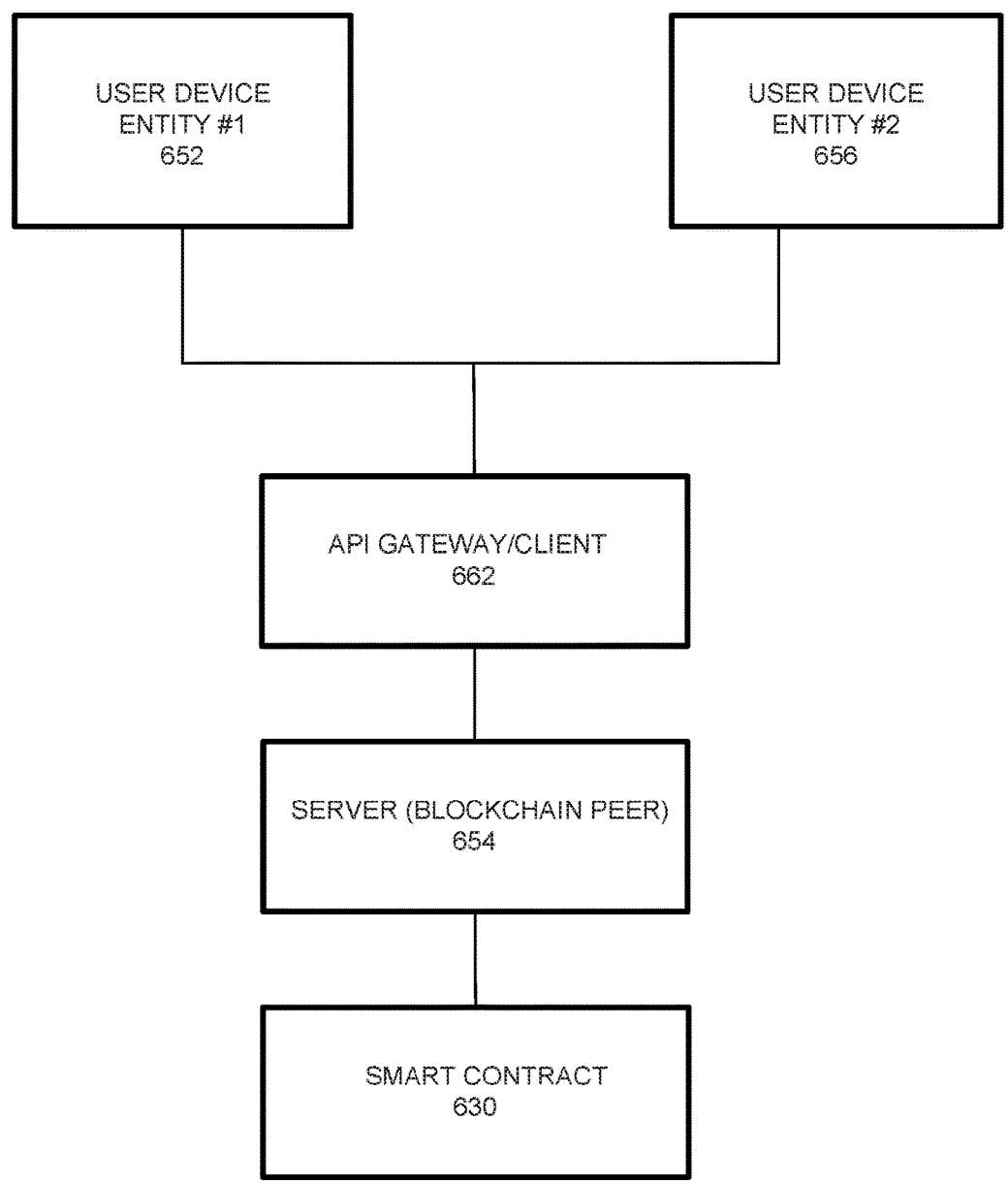
FIG. 6D illustrates another an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
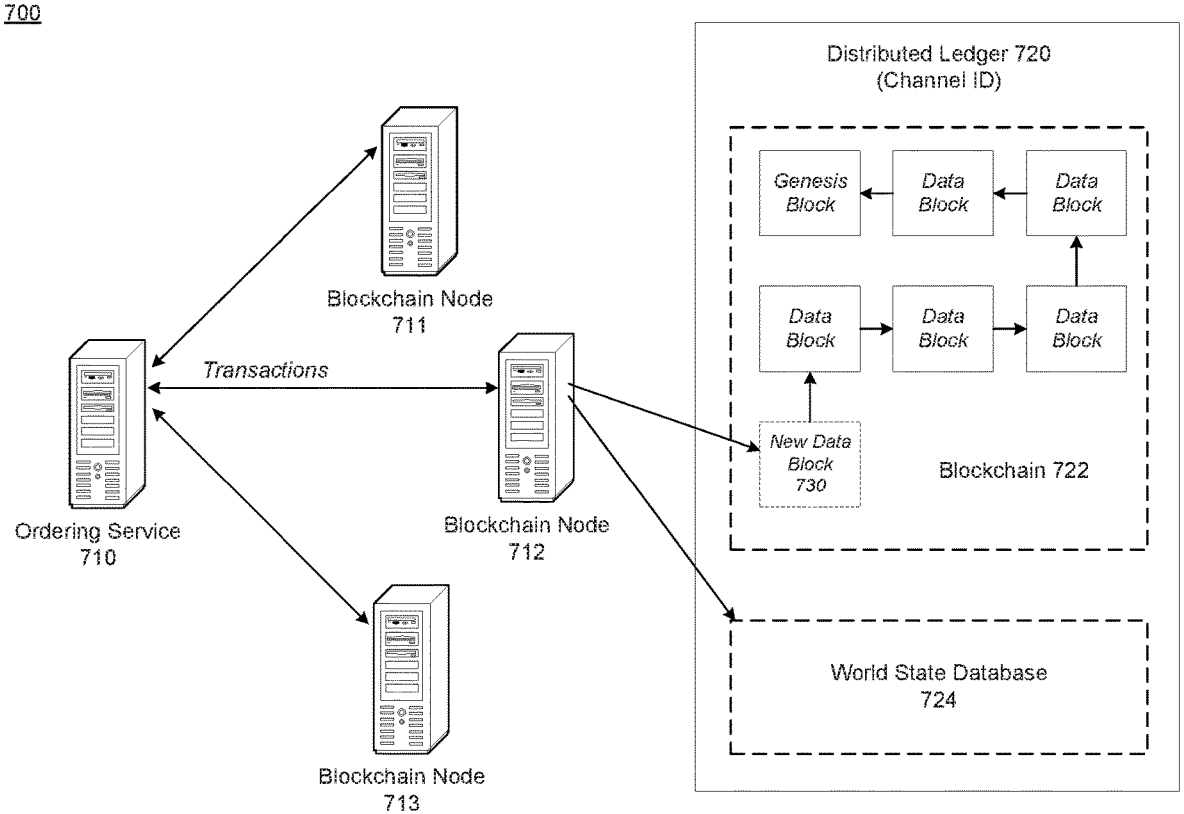
FIG. 7A illustrates a process of new data being added to a database, according to example embodiments.
Figure 7B:
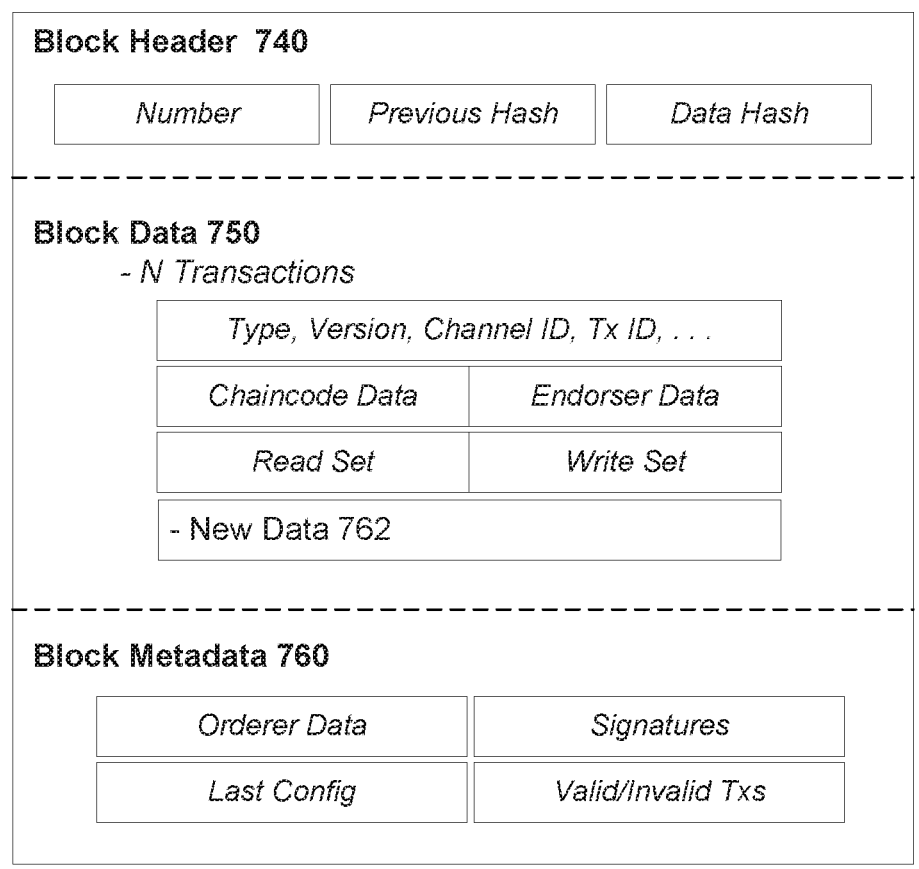
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772 which adds additional information to the hash-linked chain of blocks in the blockchain 732. In one embodiment, the data 772 may be a record corresponding to or referencing an event transmitted in the network as described herein. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 7C:
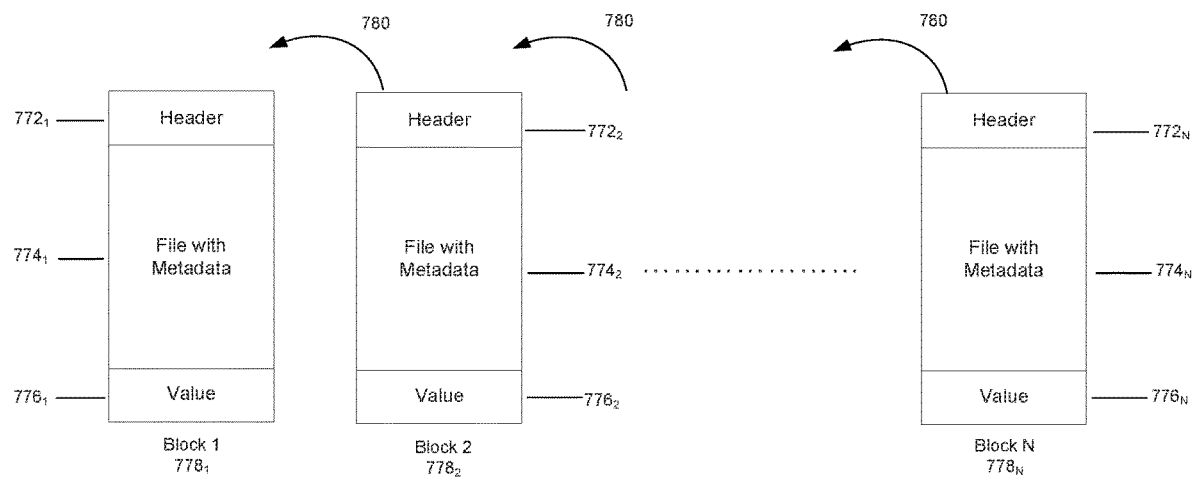
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata.

Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
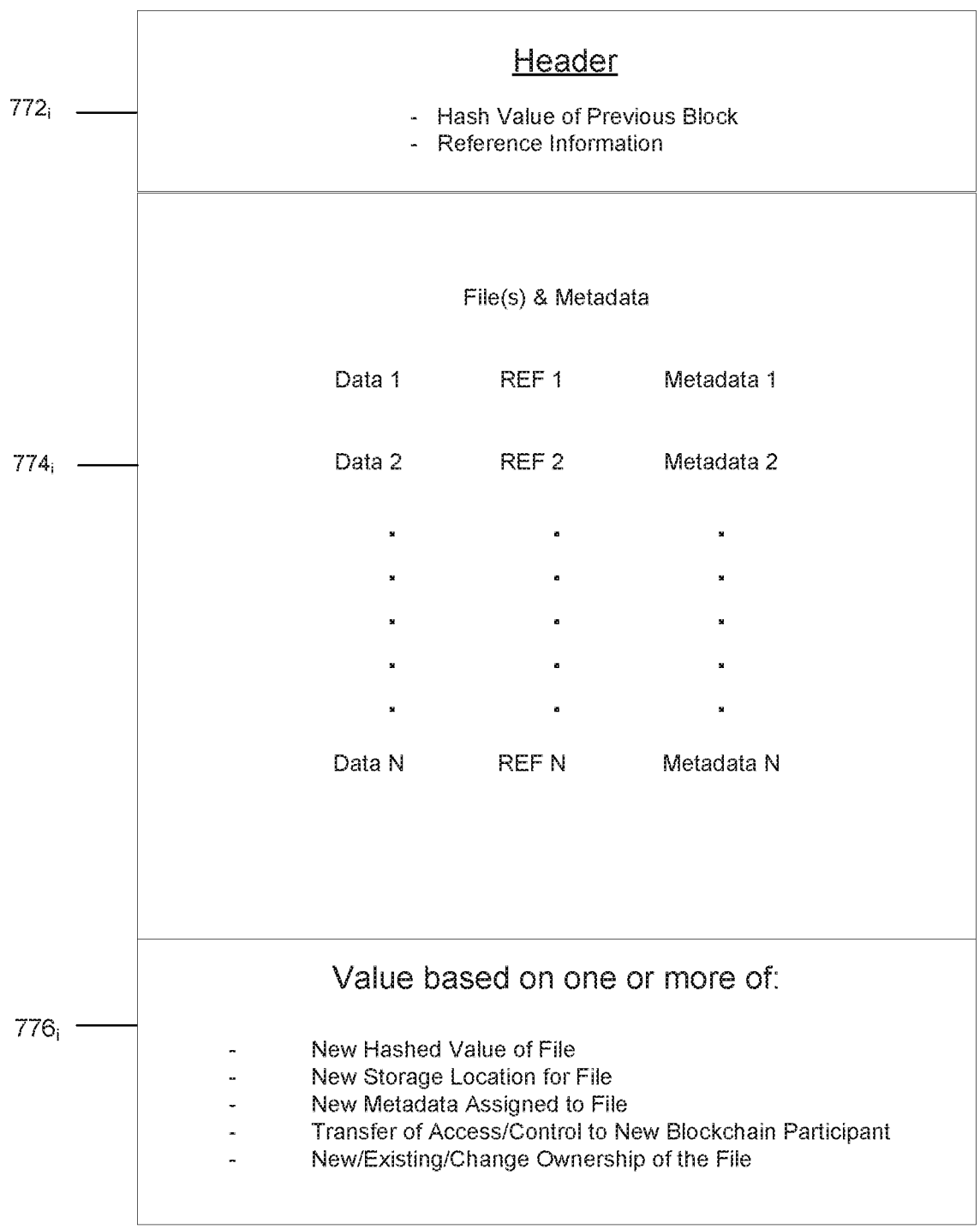
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.
- a) new SHA-2 computed hash value if the file has been processed in any way (e.g., if the file was redacted, copied, altered, accessed, or some other action was taken)
- b) new storage location for the file
- c) new metadata identified associated with the file
- d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8:
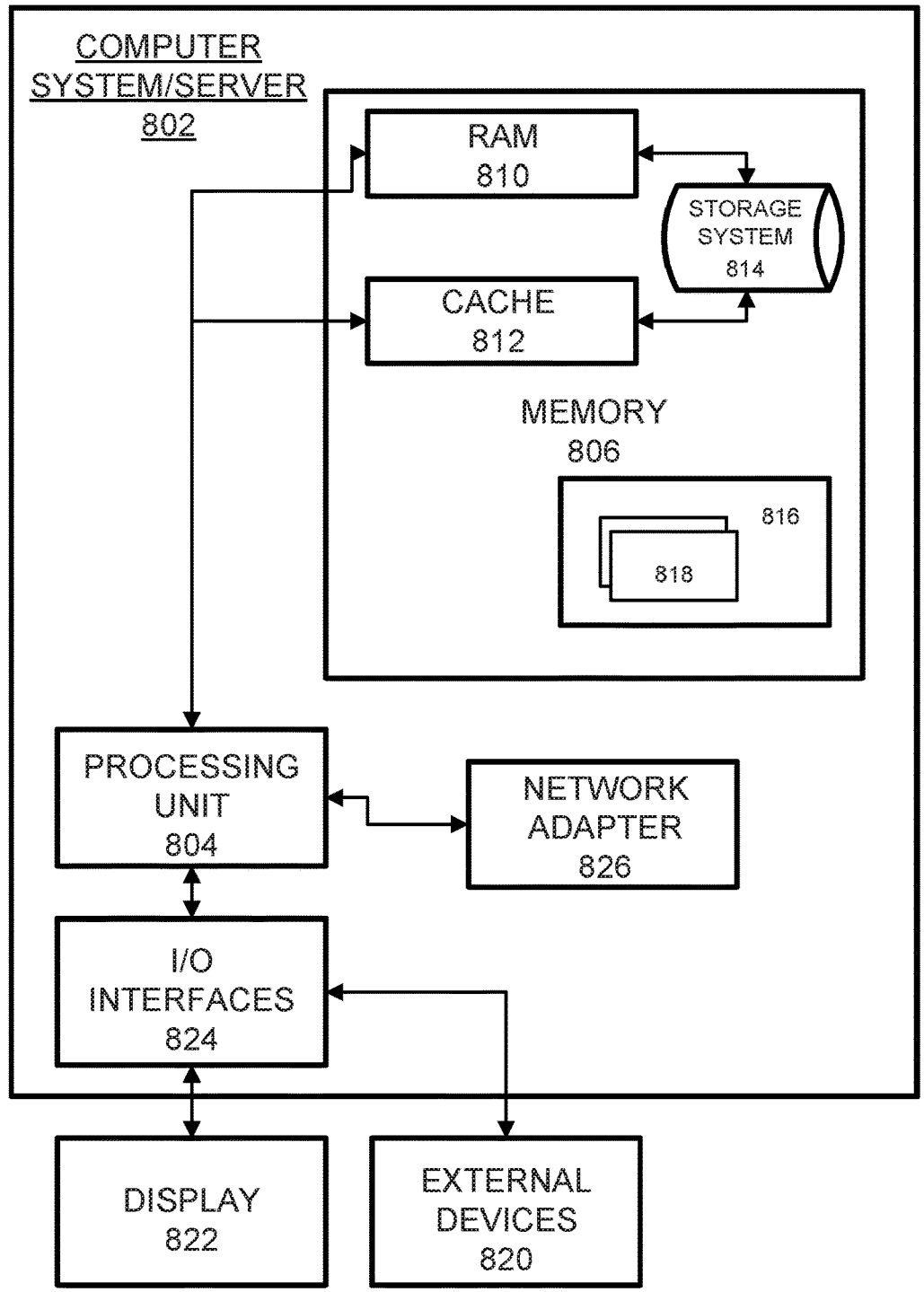
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer device comprising:
 a processor to:
  receive, from a chaincode in an event source, an event via a receiver associated with the computer device; and
 a storage area to:
  store a previous counter value of a previous event associated with the chaincode, and
  store a secret identifying a status of the event,
 wherein the processor further is to:
  extract an identifier from the event, the identifier being a first hash of a value of an event counter that counts a number of events that have been transmitted from the event source via the chaincode,
  identify the event as an authorized event based on:
   the identifier matching a second hash of the previous counter value,
   a number of set bits in the identifier is less than or equal to a predetermined maximum counter value for the chaincode, and
   the secret matching a key encrypting the event.

2. The system of claim 1, wherein the first hash and the second hash include hash-based message authentication codes.

3. The system of claim 1, wherein the processor further is to:
 update the second hash to correspond to a next value of the event counter after the identifier is authorized.

4. The system of claim 1 wherein the processor further is to:
 discard the event when the identifier is not authorized.

5. The system of claim 4, wherein the processor further is to:
 discard the event without notification to the user that the event has been received.

6. The system of claim 1, wherein the storage system includes a blockchain network.

7. The system of claim 6, wherein the identifier provides an indication of a state of confidential chaincode used to generate the event.

8. A method, comprising:
 receiving, by a computer device, an event from a node storing a previous counter value of a previous event associated with the node and storing a secret identifying a status of the event;
 extracting, by the computer device, an identifier from the event, the identifier being a first hash of a value of an event counter that counts a number of events that have been transmitted from the node;
 identifying, by the computer device, the event as an authorized event based on:
  matching the identifier to a second hash of a previous counter value of the previous event,
  verifying that a number of set bits in the identifier is less than or equal to a predetermined maximum counter value for the chaincode, and
  matching the secret to a key encrypting the event; and
 generating, by the computer device, a notification of the authorized event.

9. The method of claim 8, wherein the event counter stores a number of events of confidential status transmitted through the node in the storage system.

10. The method of claim 8, further comprising:
 updating the second hash to correspond to a next value of the event counter after the identifier is authorized.

11. The method of claim 8, further comprising:
 discarding the event when the identifier is not authorized.

12. The method of claim 11, wherein the discarding the event further comprises:
discarding the event without notifying a user of the client that the event has been received.

13. The method of claim 8, wherein the identifying the event as an authorized event further comprises:
filtering the event via a bloom filter.

14. The method of claim 8, wherein the identifier provides an indication of a state of confidential chaincode used to generate the event.

15. The method of claim 8, further comprising:
decrypting the event with a private key after the identifier is authorized to allow access of content of the event to a user of the client.

16. The method of claim 8, wherein the hashed value of the event counter includes a hash-based message authentication code.

17. A non-transitory computer-readable medium storing one or more instructions that when executed by a processor cause the processor to:
receive an event from a node storing a previous counter value of a previous event associated with the node and storing a secret identifying a status of the event;
extract an identifier from the event, the identifier being a first hash of a value of an event counter that counts a number of events that have been transmitted from the node;
identify the event as an authorized event based on:
the identifier matching a second hash of a previous counter value of the previous event,
a number of set bits in the identifier is less than or equal to a predetermined maximum counter value for the chaincode, and
the secret matching a key encrypting the event; and
generate a notification of the authorized event.

18. The medium of claim 17, wherein the event counter stores a number of events of confidential status transmitted through the node in the blockchain network.

19. The medium of claim 17, wherein the one or more instructions further cause the processor to:
update the second hash to correspond to a next value of the event counter after the identifier is authorized.

20. The medium of claim 17, wherein the one or more instructions further cause the processor to:
discard the event when the identifier is not authorized,
wherein the event is to be discarded without notification to a user of the client that the event has been received.

* * * * *